C. BURNHAM.
BOX MAKING MACHINE.
APPLICATION FILED NOV. 29, 1912.
1,154,610.
Patented Sept. 28, 1915.
17 SHEETS—SHEET 2.
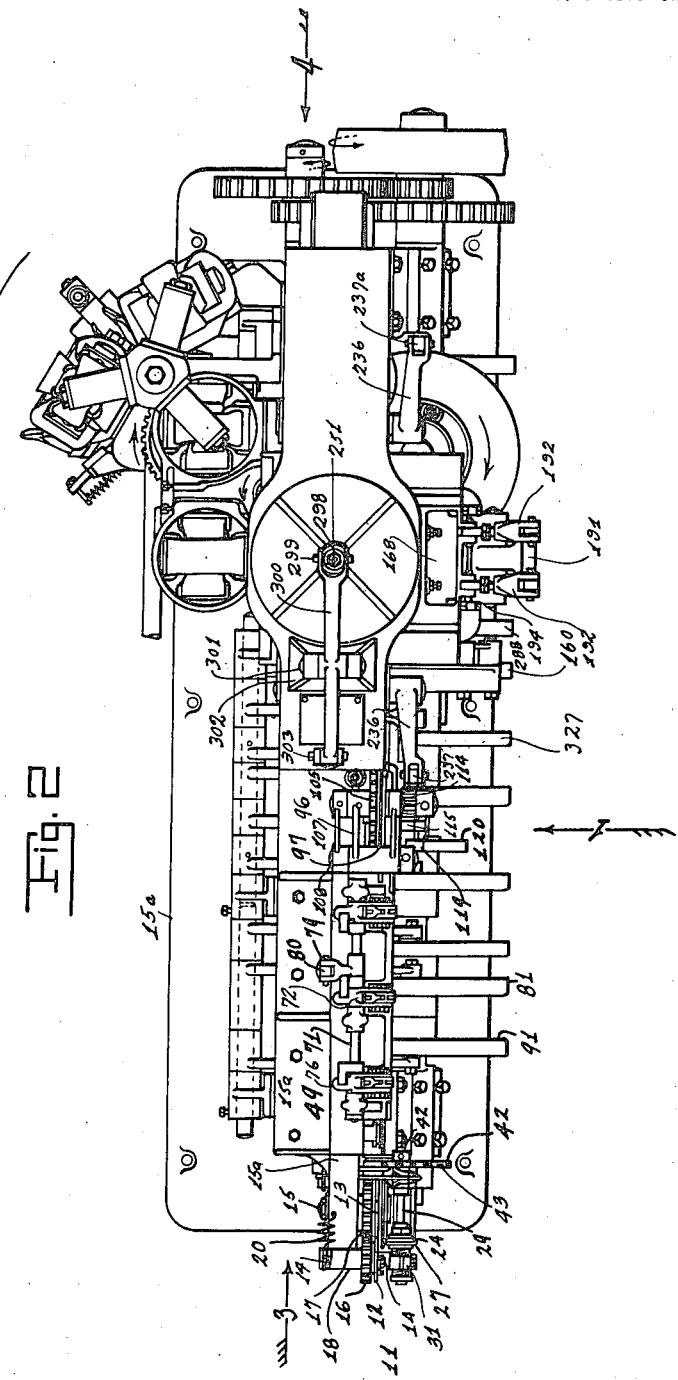
Witnesses:
C. Bartels
L. C. Mayer
Inventor
Charles Burnham
By his Attorneys
Criswell & Criswell

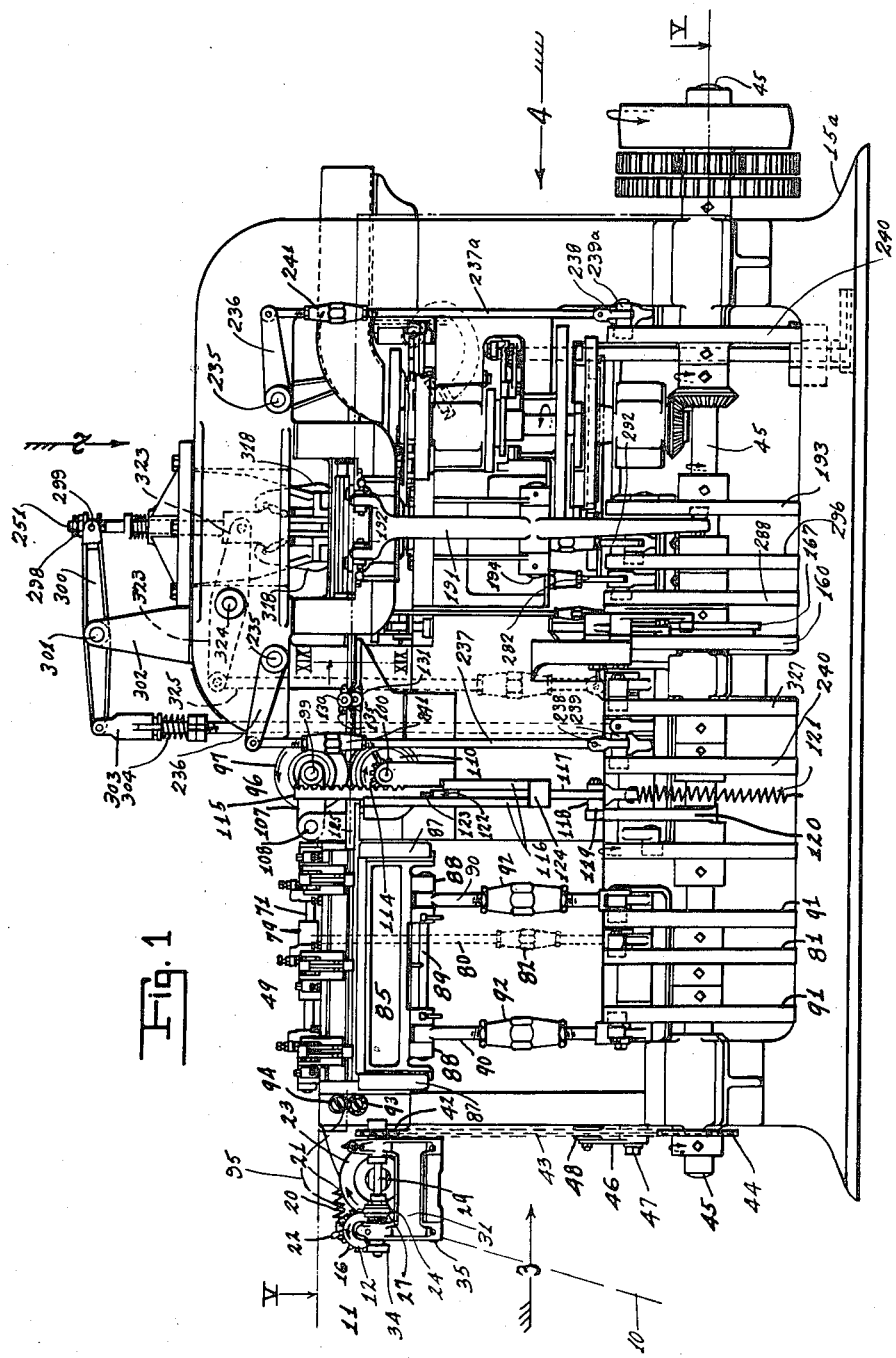

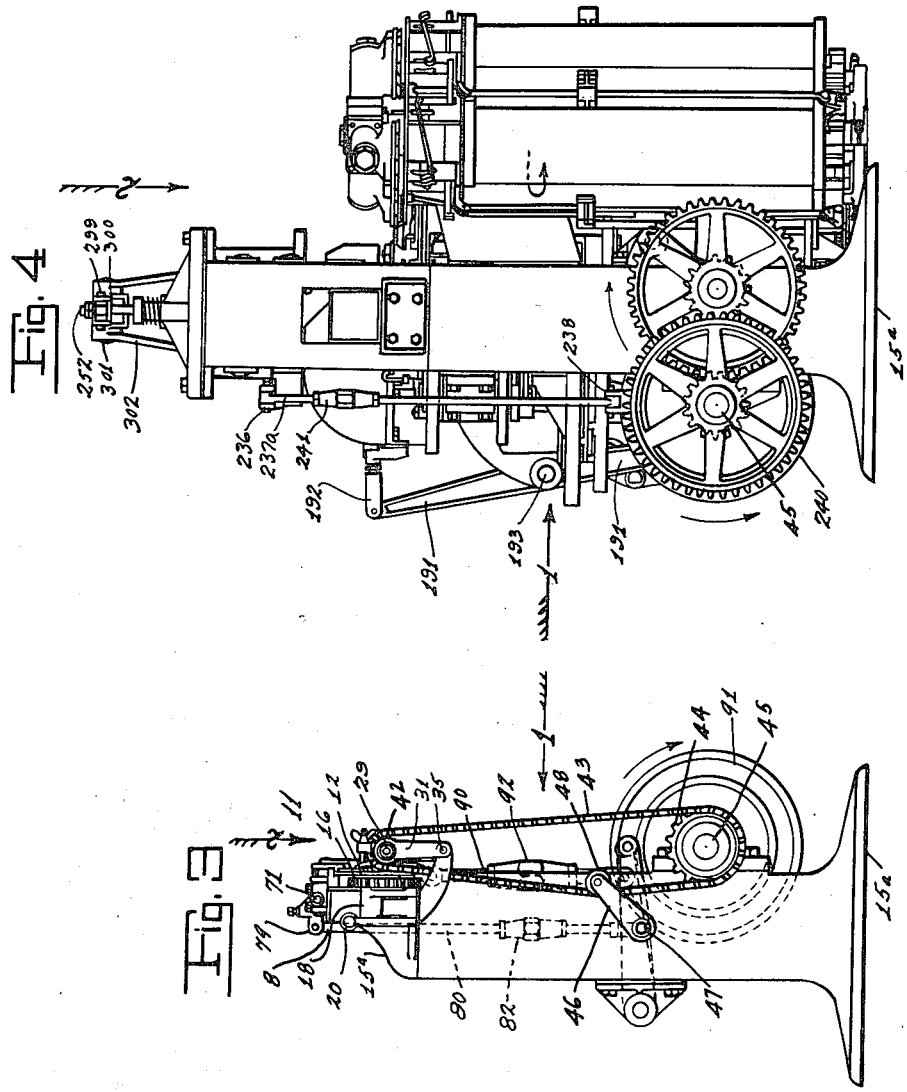

C. BURNHAM.
BOX MAKING MACHINE.
APPLICATION FILED NOV. 29, 1912.

1,154,610.

Patented Sept. 28, 1915.
17 SHEETS—SHEET 4.

Fig. 5

Witnesses:
C. Bartels
L. A. Mayer

Inventor
Charles Burnham
By his Attorneys
Criswell & Criswell

C. BURNHAM.
BOX MAKING MACHINE.
APPLICATION FILED NOV. 29, 1912.
1,154,610.
Patented Sept. 28, 1915.
17 SHEETS—SHEET 5.
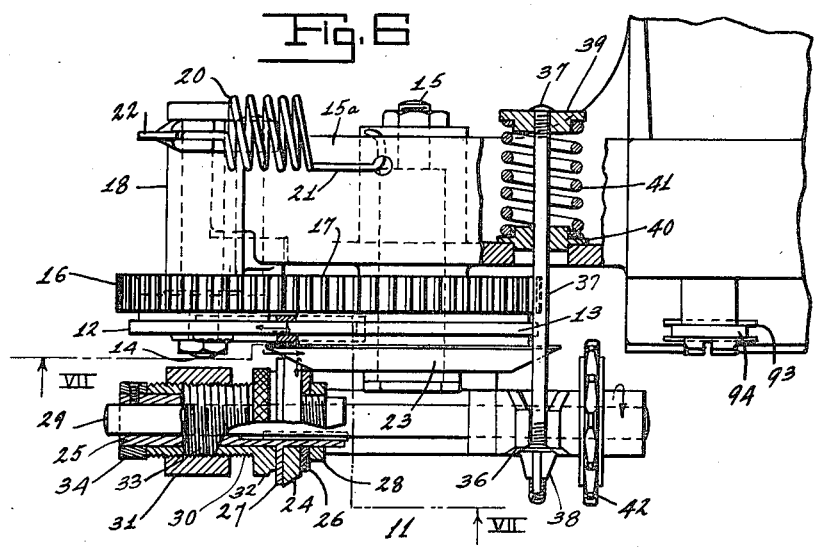
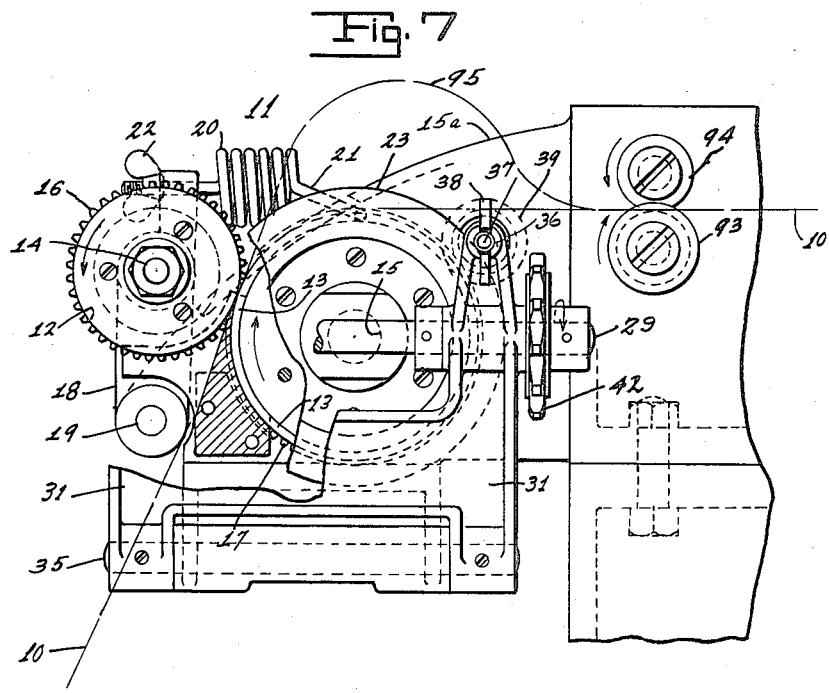
Witnesses:
Inventor
Charles Burnham
By his Attorneys C. BURNHAM.
BOX MAKING MACHINE.
APPLICATION FILED NOV. 29, 1912.
1,154,610.
Patented Sept. 28, 1915.
17 SHEETS—SHEET 6.
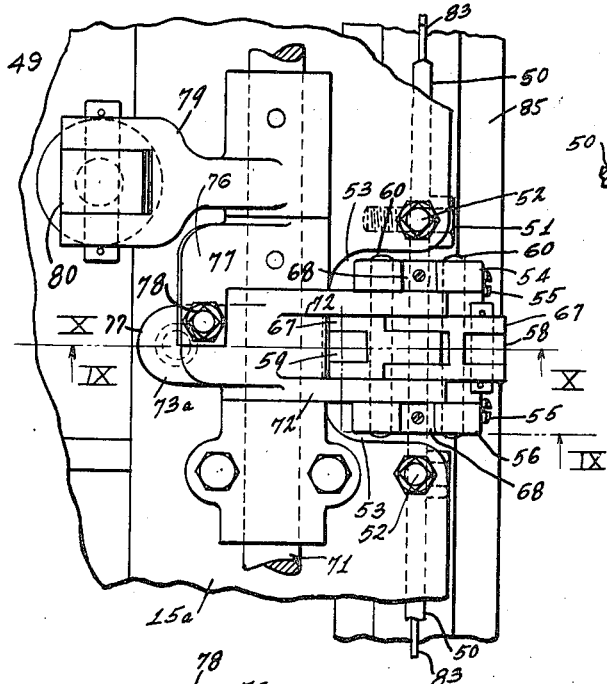
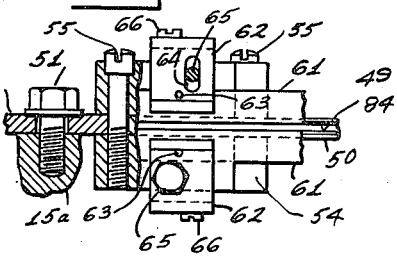
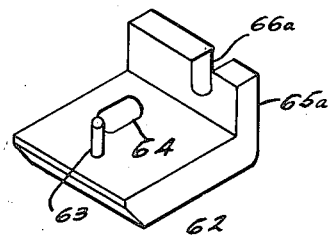
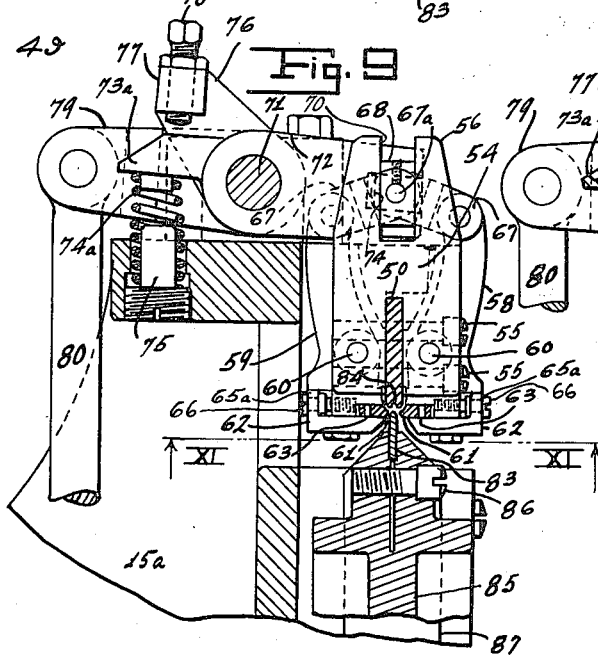
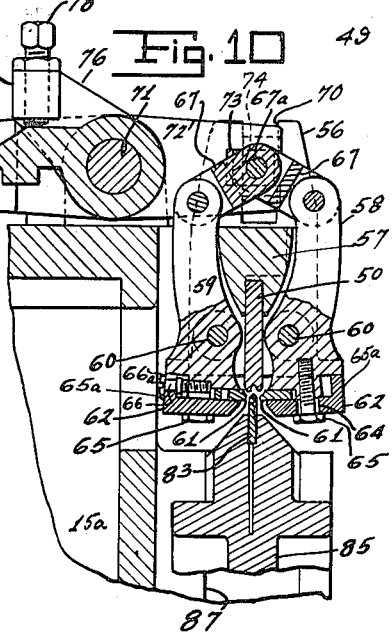
Witnesses:
C. Bartels
L. J. Mayer
Inventor
Charles Burnham
By his Attorneys
Criswell & Criswell

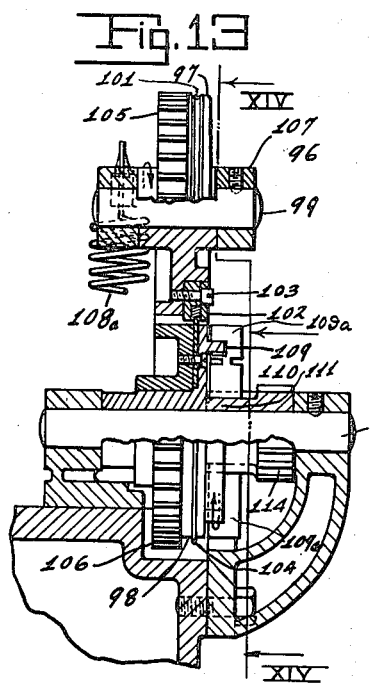
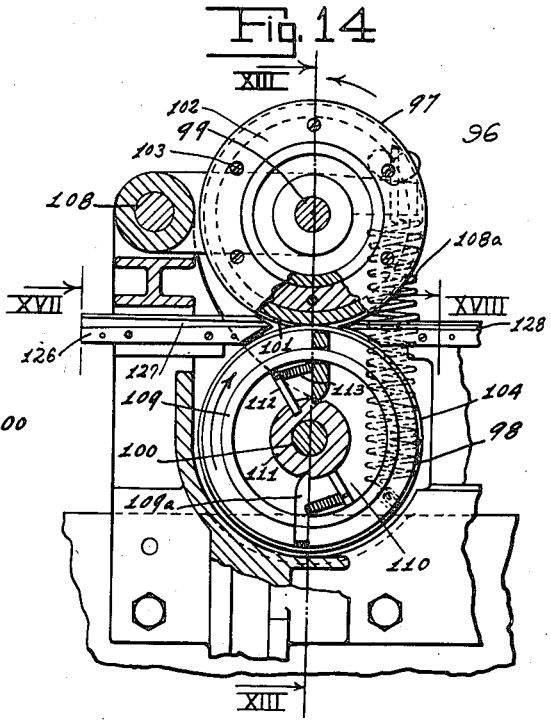
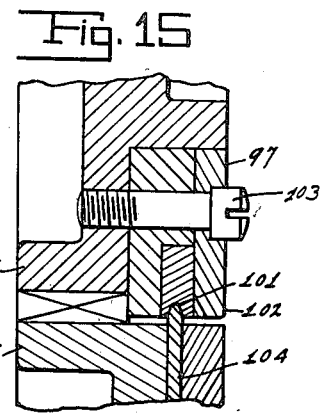
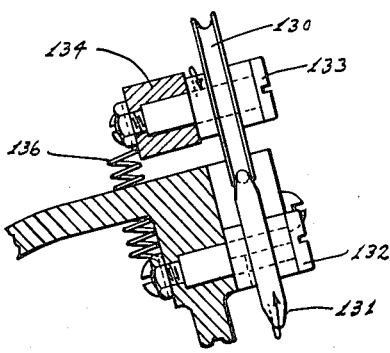
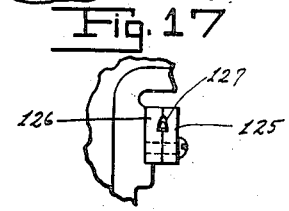
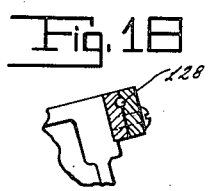
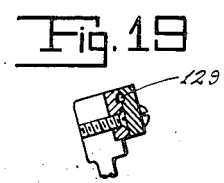

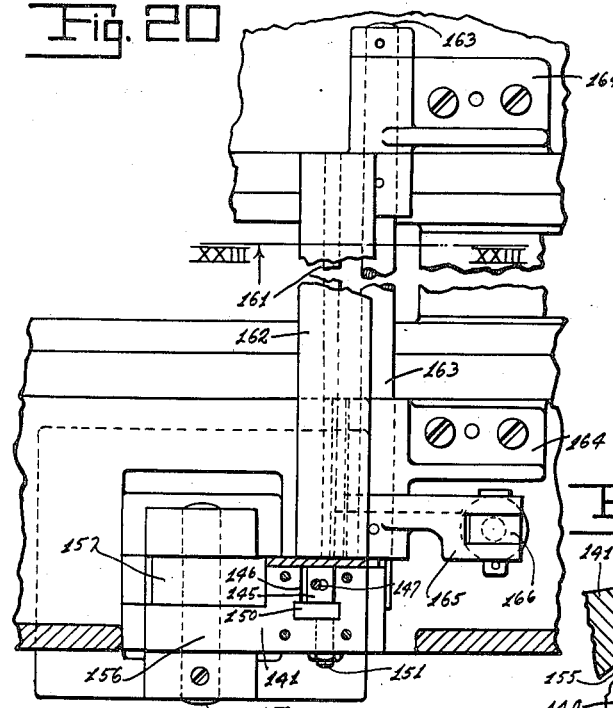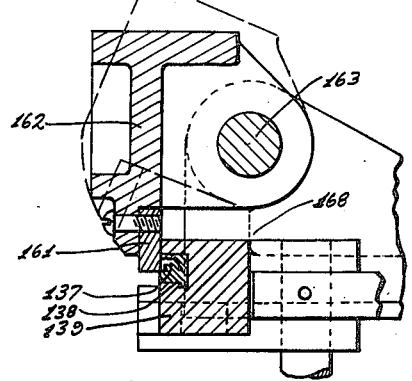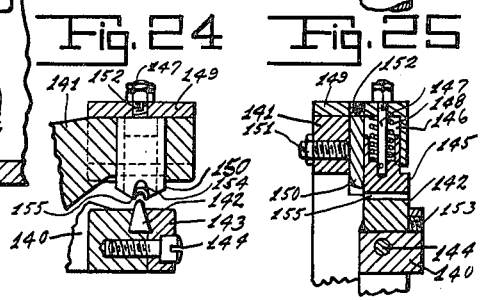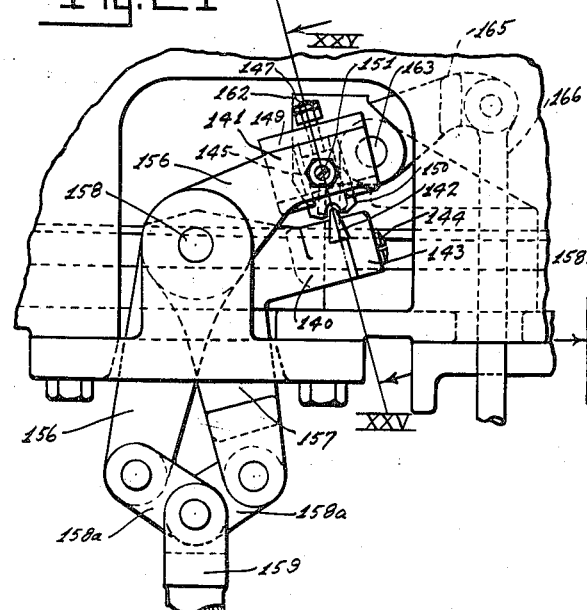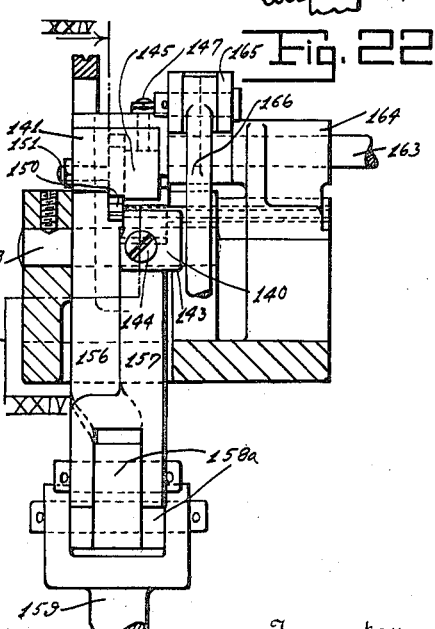

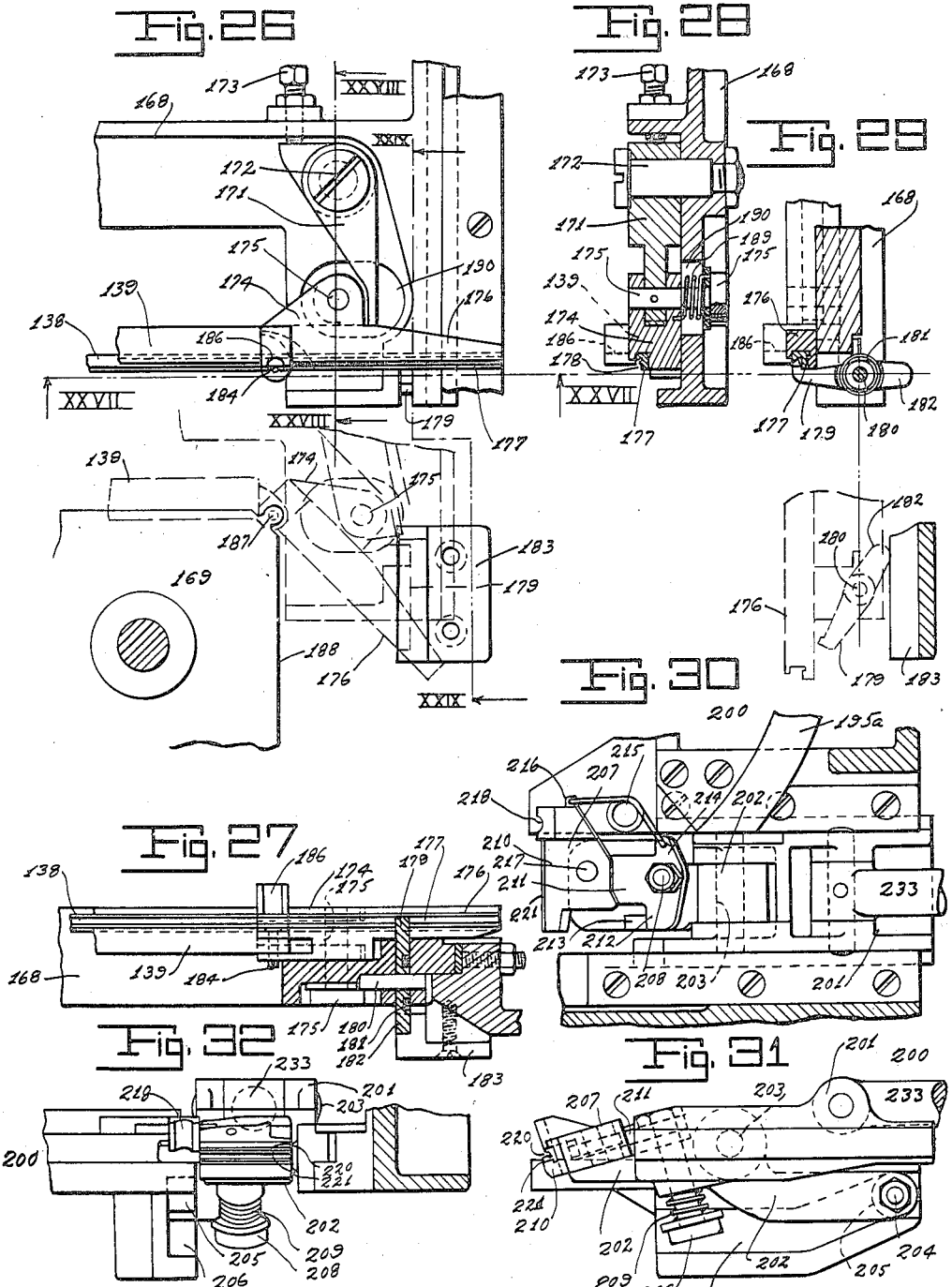

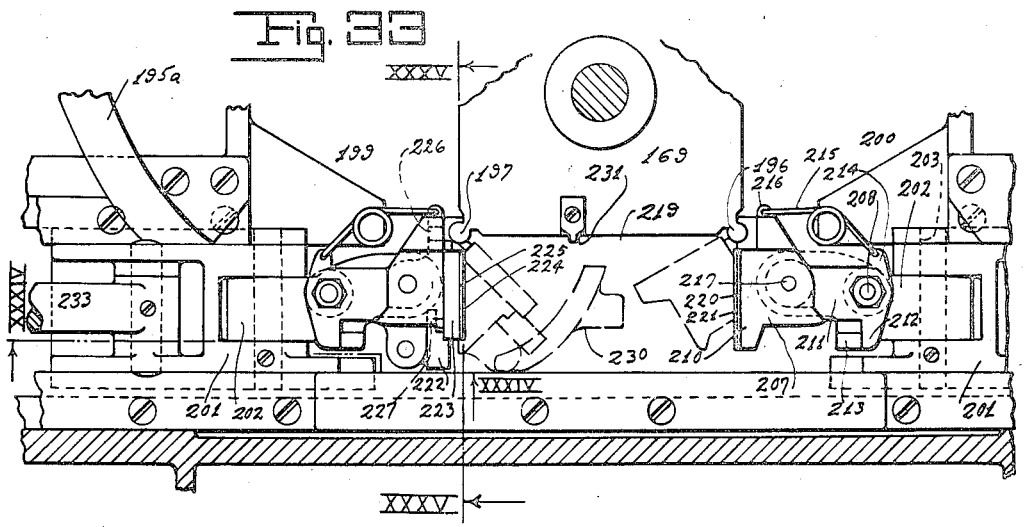
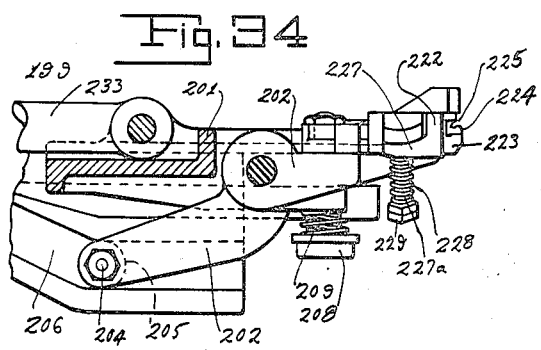
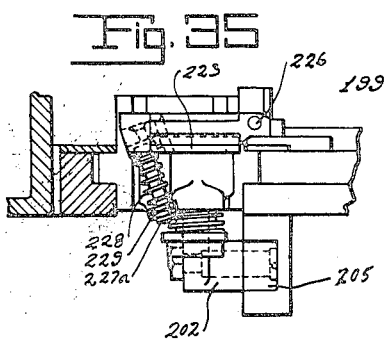
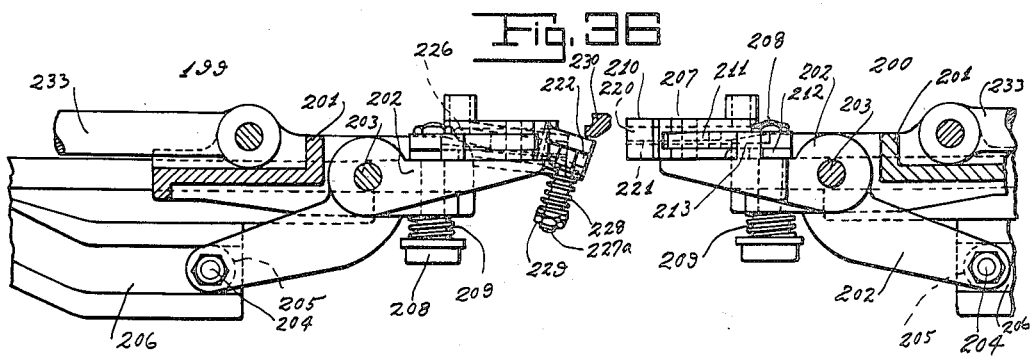

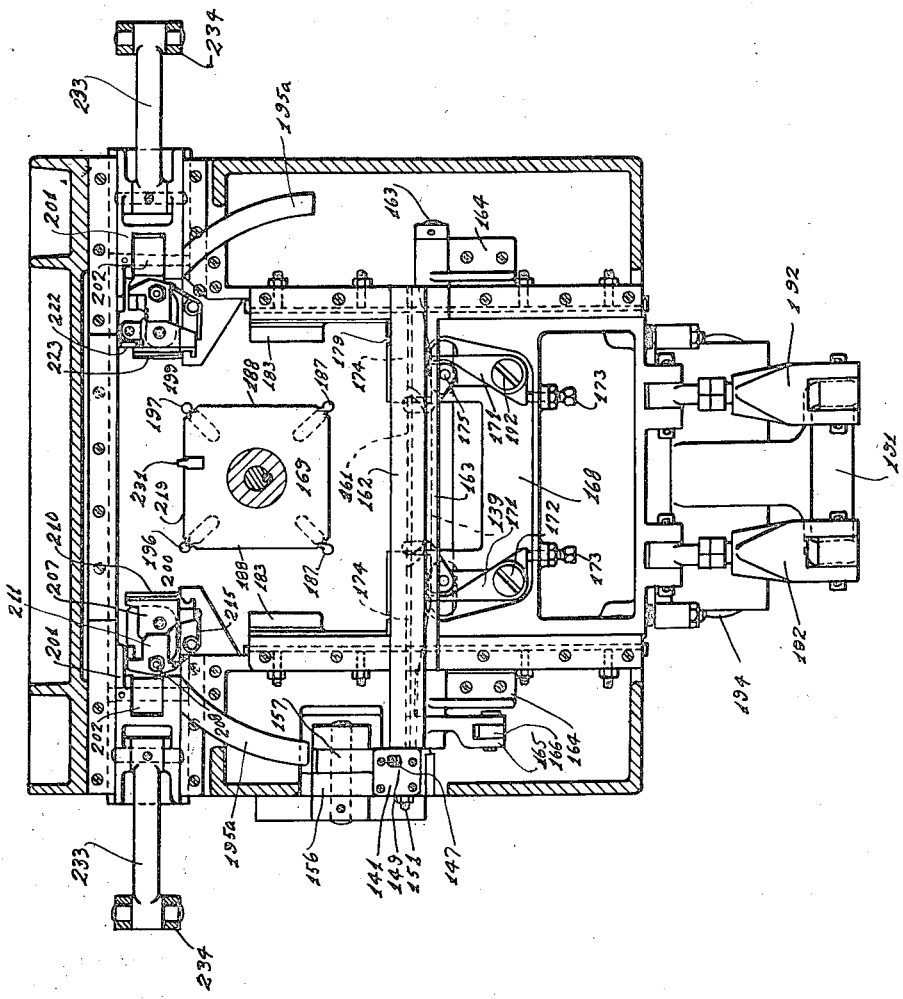

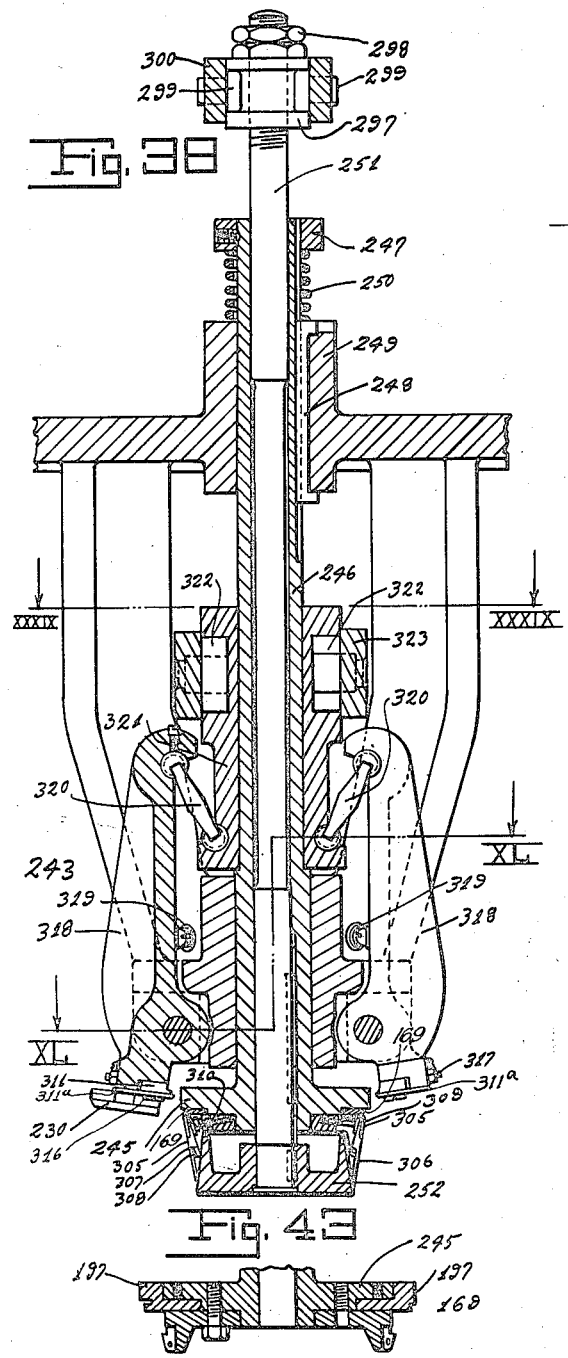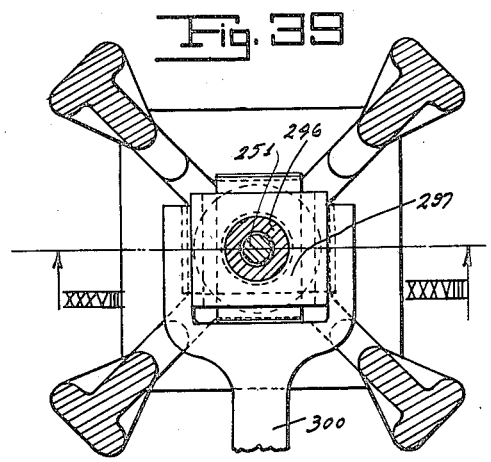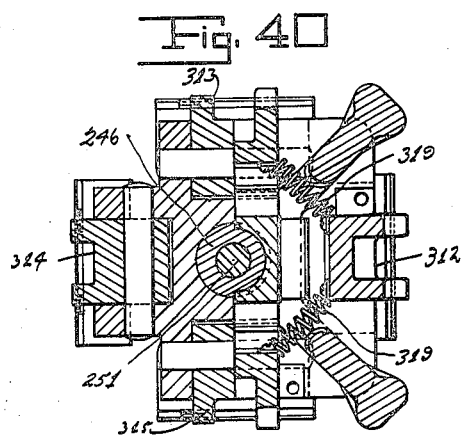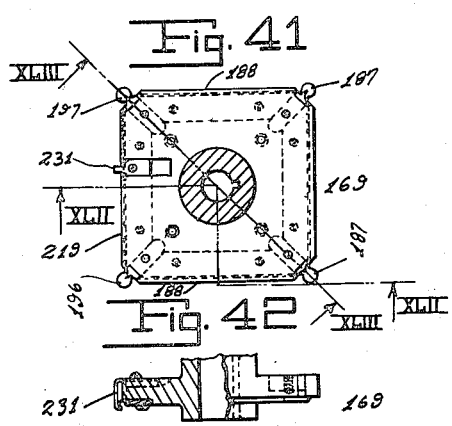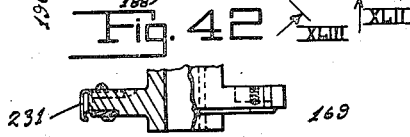

C. BURNHAM.
BOX MAKING MACHINE.
APPLICATION FILED NOV. 29, 1912.
1,154,610.
Patented Sept. 28, 1915.
17 SHEETS—SHEET 13.
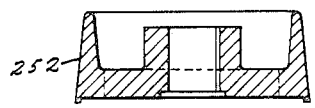
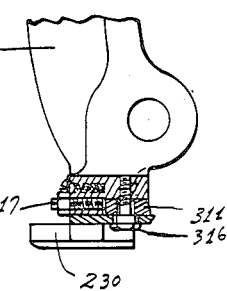
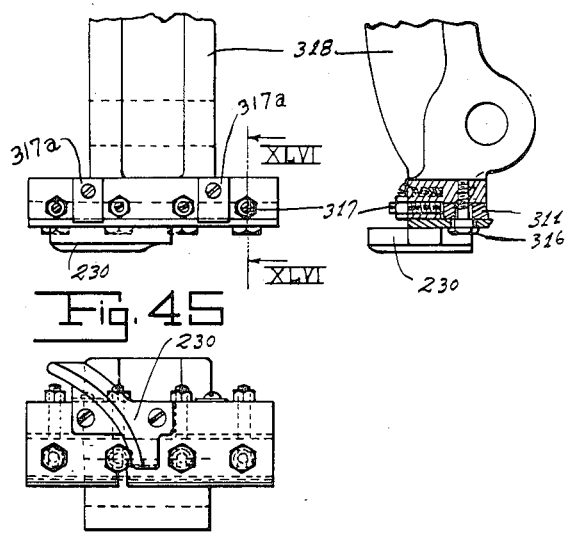
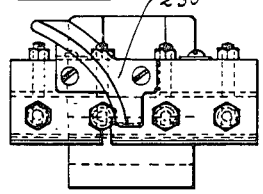
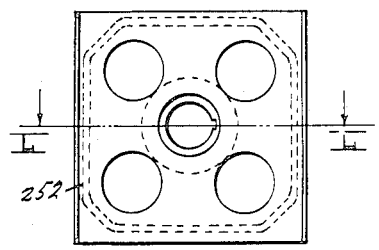
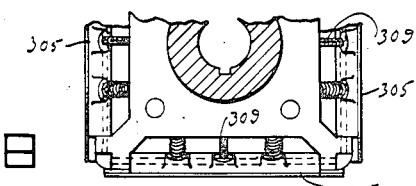
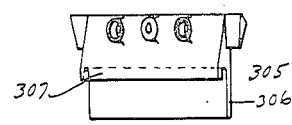
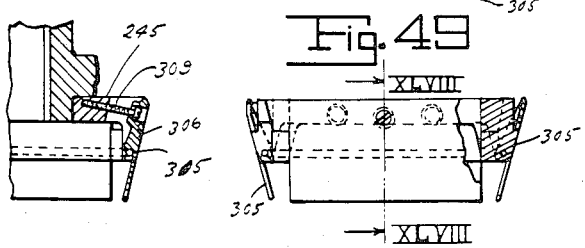
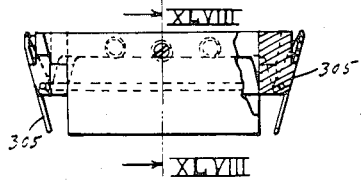
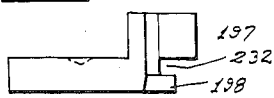
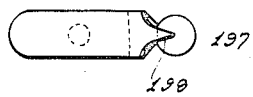
Witnesses:
C. Bartels
L. L. Mayer
Inventor
Charles Burnham
By his Attorneys

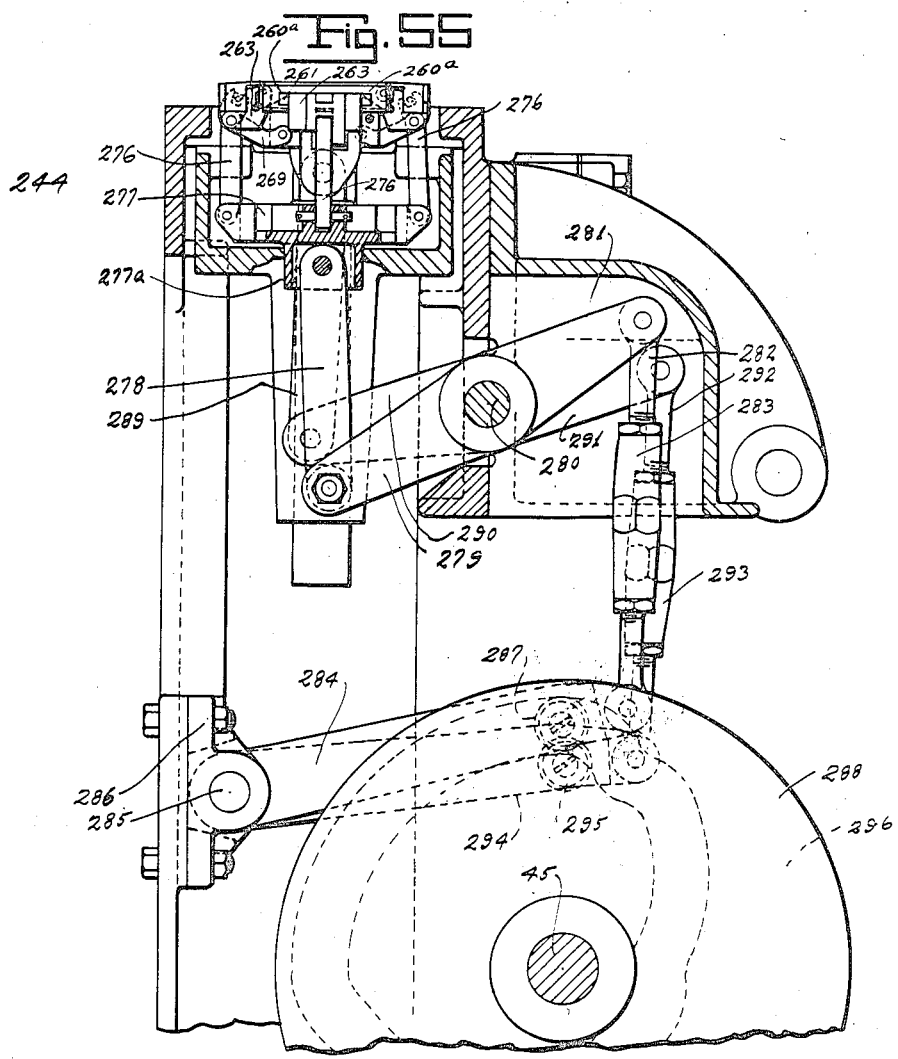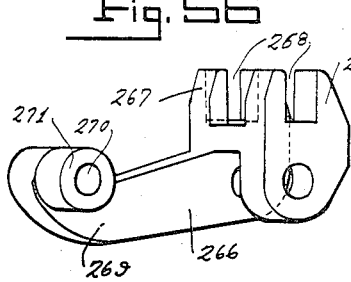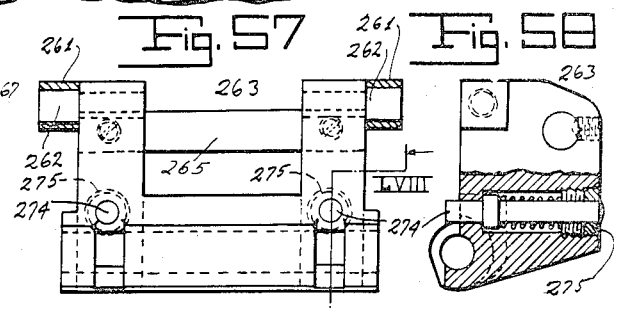

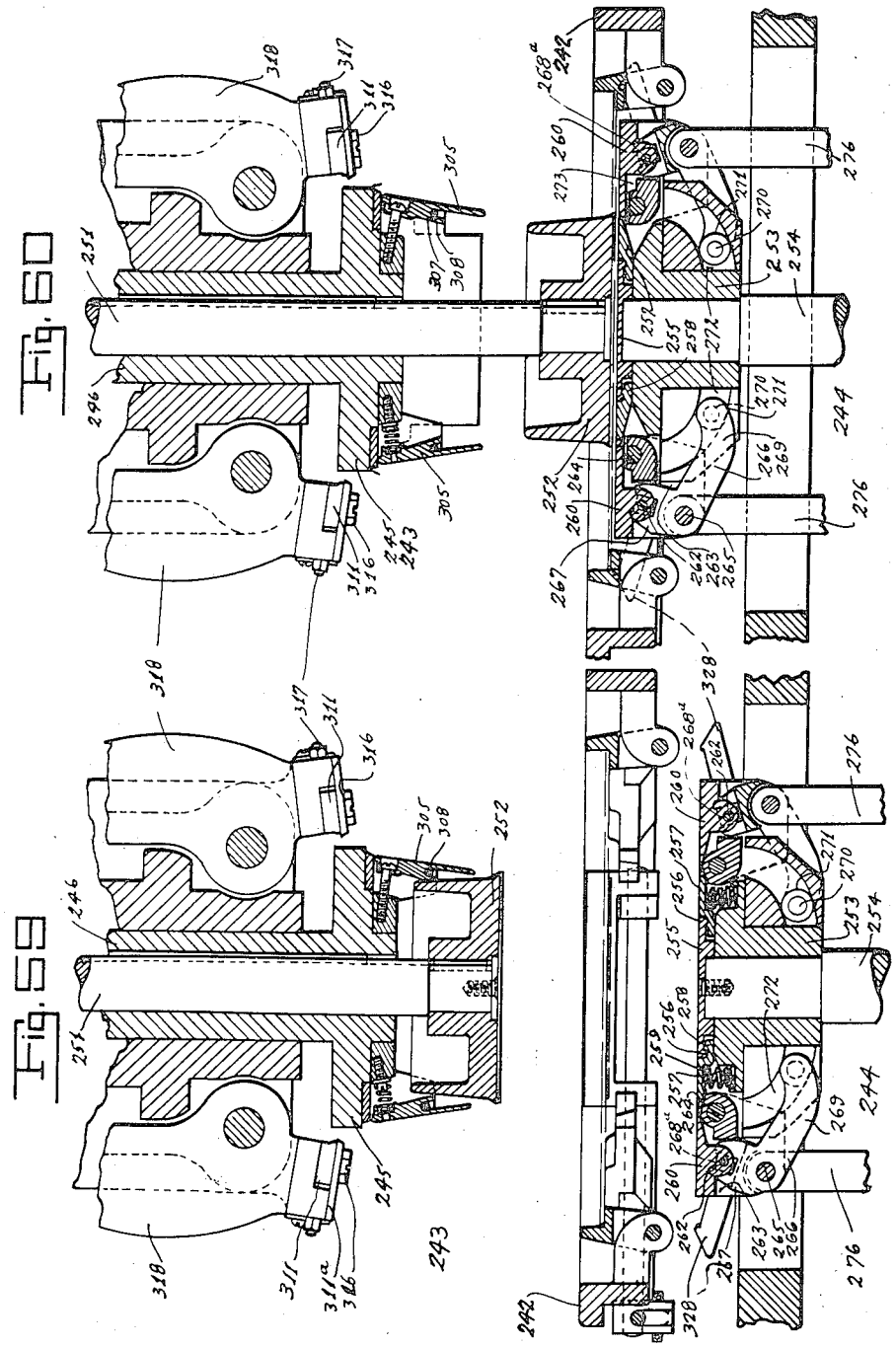

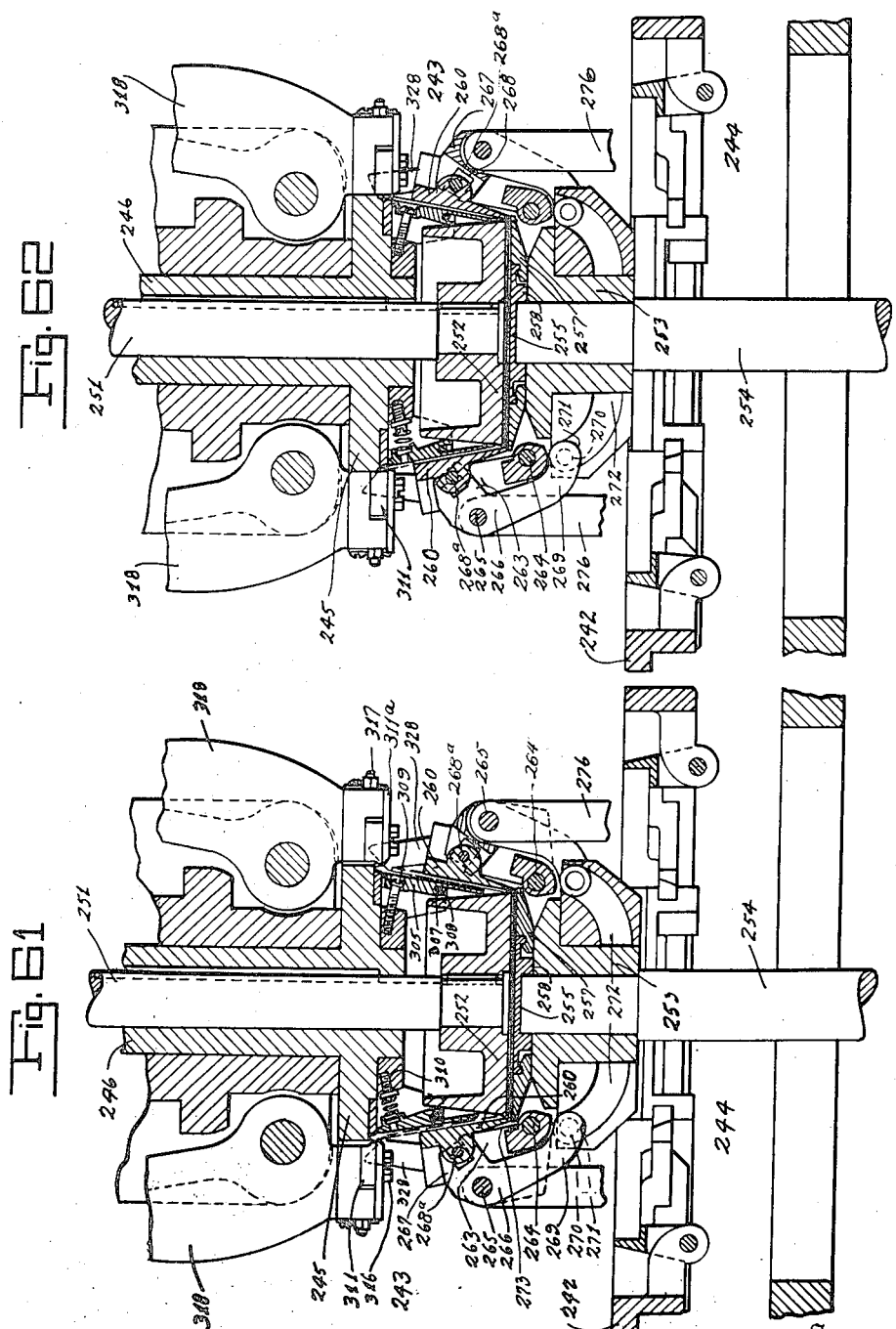

C. BURNHAM.
BOX MAKING MACHINE.
APPLICATION FILED NOV. 29, 1912.
1,154,610.
Patented Sept. 28, 1915.
17 SHEETS—SHEET 17.
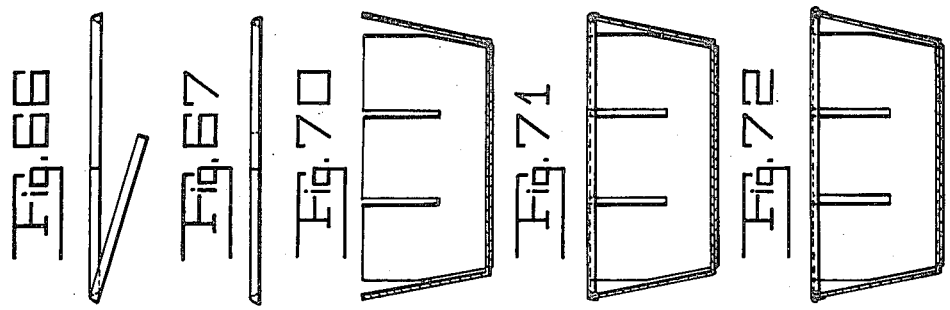
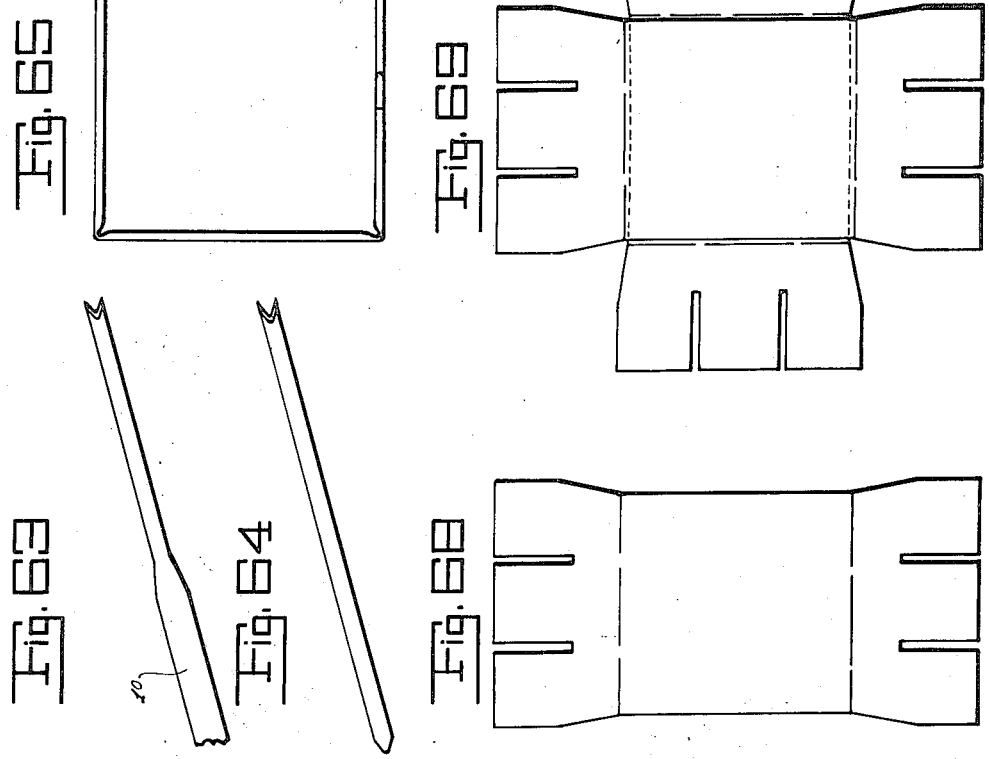
Witnesses:
C. Bartels
L. L. Mayer
Inventor
Charles Burnham
By his Attorneys
Cruwell & Cruwell

UNITED STATES PATENT OFFICE.

CHARLES BURNHAM, OF LOS ANGELES, CALIFORNIA, ASSIGNOR TO BURNHAM BASKET COMPANY, A CORPORATION OF CALIFORNIA.

BOX-MAKING MACHINE.

1,154,610.  Specification of Letters Patent.  Patented Sept. 28, 1915.

Original application filed August 22, 1911, Serial No. 645,323. Divided and this application filed November 29, 1912. Serial No. 734,155.

*To all whom it may concern:*

Be it known that I, CHARLES BURNHAM, a citizen of the United States, and a resident of Los Angeles, county of Los Angeles, and State of California, have invented certain new and useful Improvements in Box-Making Machines, of which the following is a full, clear, and exact description.

This invention relates more particularly to mechanism for folding and bending a metal strip forming a binding for fruit and berry boxes and the like, and is a division of my pending application, Sr. No. 645,323, filed August 22, 1911, now Patent No. 1,119,340, dated December 1, 1914.

One of the principal objects of the invention is to provide simple and efficient automatic mechanism by which a long metallic strip may be folded lengthwise thereof substantially V-shaped or U-shaped and the folded strip cut the proper length and bent transversely to conform to the shape of the boxes to which the metal binding is applied and to clench the metal binding to the boxes or other object to hold the parts together.

Another object of the invention is to provide simple and efficient mechanism by which a metallic strip may be folded lengthwise and bent transversely and the ends of the strip caused to overlap so that the said strip may be bound entirely around a box or object and the ends thereof made to lie substantially flush when the strip is applied to said object.

Other objects of the invention are to provide simple and efficient means for bending binding metal around a substantially rectangular anvil or former and to hold the same in position to receive the open end of a box or object and so to bend the binding that the latter is substantially closed at the corners thereof and open between the corners for the reception of the parts of an object; to provide box forming means, a part of which forms a support for the former about which the binding metal is bent; and to provide means whereby the binding metal may be applied to a box body or other object.

A further object of the invention is to provide simple and efficient mechanism including a plurality of bodily movable and pivotally held bending jaws which are adapted to hold and bend binding metal about a former.

With these and other objects in view, the invention will be hereinafter more particularly described with reference to the accompanying drawings, which form a part of this specification, and will then be pointed out in the claims at the end of the description.

In the drawings, Figure 1 is a side elevation of one form of machine embodying my invention. Fig. 2 is a plan view. Fig. 3 is an end elevation of that part of the machine from which the metal binding stock is fed. Fig. 4 is an end elevation, showing the shook magazines and looking at the machine from the opposite end to that shown in Fig. 3. Fig. 5 is a sectional plan view, taken on the line V—V of Fig. 1. Fig. 6 is a fragmentary plan view, partly in section, of the means for feeding the metal binding strip to the machine. Fig. 7 is an elevation, partly in section, the section being taken on the line VII—VII of Fig. 6 of the feed mechanism. Fig. 8 is a fragmentary plan view of the means for forming the metal strip into substantially V-shaped form in order that it may fit on the inner and outer sides of the box edge when applied to the box form. Fig. 9 is a transverse section, partly in elevation, taken on the line IX—IX of Fig. 8 of the forming mechanism. Fig. 10 is a transverse section taken on the line X—X of Fig. 8, the parts being shown in a different position from that shown in Fig. 9. Fig. 11 is a fragmentary inverted plan, partly in section, taken on the line XI—XI of Fig. 9. Fig. 12 is a detail perspective view of one of the forming guide supports. Fig. 13 is a fragmentary view, partly in section and partly in elevation, of means for feeding the formed strip, the section being taken on the line XIII—XIII of Fig. 14. Fig. 14 is a sectional view, partly in elevation, taken on the line XIV—XIV of Fig. 13. Fig. 15 is an enlarged fragmentary view of the feed rolls. Fig. 16 is a sectional view, partly in elevation, of the tilting rolls for tilting the metal into the position which it should assume before being bent around the anvil or element preparatory to its application to the box form. Fig. 17 is an elevation of the guide for the formed binding strip looking in the direction of arrow XVII of Fig. 14. Fig. 18 is a section taken on the line XVIII of Fig. 14. Fig. 19 is a section taken through the guides but beyond the section shown in Fig. 18. Fig. 20 is a fragmentary plan view showing part of the reciprocatory frame and means for holding the metal binding strip preparatory to moving the same adjacent to the die mechanism, and also showing the means for cutting off the formed strip the proper length. Fig. 21 is a fragmentary elevation of the cutting means. Fig. 22 is a vertical section, partly in elevation, of the mechanism shown in Figs. 20 and 21. Fig. 23 is a transverse section taken on the line XXIII—XXIII of Fig. 20. Fig. 24 is a fragmentary sectional view of a part of the gripping and cutting mechanism, the section being taken on the line XXIV—XXIV of Fig. 22. Fig. 25 is a fragmentary sectional view taken on the line XXV—XXV of Fig. 21. Fig. 26 is a fragmentary plan view, partly broken away and partly in elevation, showing a part of the binding strip as it is fed inward and which by movement forms the initial bend about the anvil, the parts being shown in a reversed position to that shown in Fig. 5. Fig. 27 is a vertical section, partly in elevation taken on the line XXVII—XXVII of Fig. 26. Fig. 28 is a vertical section taken on the line XXVIII—XXVIII of Fig. 26, showing one of the bending jaws for giving the first bend to the binding strip. Fig. 29 is a fragmentary view, partly in section, taken on the line XXIX—XXIX of Fig. 26, showing a device for holding the binding strip in the bending jaws, and also showing in dotted lines how this holding device is released. Fig. 30 is a view showing in plan one of the second bending jaws, that is the jaw that gives the second bend about the anvil or forming element. Fig. 31 is an elevation showing one of the jaws swung downward. Fig. 32 is an end elevation of one of the second bending jaws. Fig. 33 is a fragmentary plan, partly in section, showing the two second bending jaws in position to give the final bending to the binding metal strip, the jaws being shown on the side of the anvil opposite to that of Fig. 26. Fig. 34 is a sectional view taken on the line XXXIV—XXXIV of Fig. 33. Fig. 35 is a fragmentary section taken on the line XXXV—XXXV of Fig. 33. Fig. 36 is a longitudinal section, partly in elevation, showing the second bending jaws as they move inward toward each other to give the second or final bend to the binding strip and to cause the ends of said binding strip to overlap. Fig. 37 is a sectional plan showing the anvil or former for the binding strip and the jaws for bending the strip about the anvil. Fig. 38 is an enlarged vertical section, partly in elevation, of the die, plunger and crimping mechanism. Fig. 39 is a sectional plan view taken on the line XXXIX—XXXIX of Fig. 38. Fig. 40 is a sectional plan view taken on the line XL—XL of Fig. 38. Fig. 41 is a detail plan view of the anvil or former which is carried by the plunger element. Fig. 42 is a section, partly in elevation, taken on the line XLII—XLII of Fig. 41. Fig. 43 is a section taken on the line XLIII—XLIII of Fig. 41. Fig. 44 is a fragmentary view of the crimping or pinching devices. Fig. 45 is an inverted plan view of the device shown in Fig. 44. Fig. 46 is a sectional view, partly in elevation, of the crimping device, the section being taken on the line XLVI—XLVI of Fig. 44. Fig. 47 is a fragmentary plan, partly in section, of a part of the box-forming plunger. Fig. 48 is a sectional view, taken on the line XLVIII—XLVIII of Fig. 49. Fig. 49 is an elevation, partly in section, of the box-forming plunger. Fig. 50 is a detail section of one of the plunger elements, the section being taken on the line L—L of Fig. 51. Fig. 51 is an inverted plan view, of the element shown in Fig. 50. Fig. 52 is a detail perspective view of one of the pivotally held members of the box-forming plunger. Fig. 53 is a detail side elevation of one of the corner pieces of the anvil about which the binding metal is bent. Fig. 54 is an inverted plan view of the corner piece, shown in Fig. 53. Fig. 55 is a section, partly in elevation, showing part of the die mechanism and means for operating the same. Fig. 56 is a detail perspective view of one of the levers for operating the box-folding sides or plates. Fig. 57 is a plan view of one of the die blocks or members to which the lever shown in Fig. 56 is held. Fig. 58 is a detail side elevation, partly in section, of one of the blocks shown in Fig. 57, the part in section being on the line LVIII—LVIII of Fig. 57. Fig. 59 is a fragmentary sectional view showing the plunger and crimping means, part of the carrier, and the vertically movable die or box former before the box shooks have been removed by the die from the carrier. Fig. 60 is a view somewhat similar to Fig. 59 except that the parts are in a different position, this view also showing the binding strip in position to be forced over the upper edge of the box. Fig. 61 is a view similar to Fig. 60 except that the parts are in a different position, and showing the box prior to having the binding strip applied thereto. Fig. 62 shows the box after the metallic binding strip has been applied and crimped. Figs. 63 and 64 are fragmentary detail perspective views of a part of the binding strip. Fig. 65 is a plan view showing the binding strip completed and bent ready to be applied to the box. Fig. 66 shows how the binding strip is first forced downward and then upward to permit one end to overlap the other end of the strip preparatory to being applied to the box form. Fig. 67 shows the binding strip completed and ready to be applied to the box. Fig. 68 shows a detail of one of the shooks. Fig. 69 is a plan view of the shooks in a crossed position ready to be folded; and Figs. 70 to 72 are vertical sections of the box showing the same from the time it is folded until the binding strip has been applied and crimped thereto.

While I show the features of the invention as applied to a particular form of machine, it will be understood that many of the features may be used in connection with other forms of machines and that some of the parts may be dispensed with or other features substituted therefor without departing from the spirit of the invention.

In the general operation of a box-making machine to which this invention is particularly applicable, a metallic strip is fed from a reel or otherwise suitably supported convenient to the machine, and this strip by suitable mechanism is fed to what I term forming mechanism, that is the metal is bent or formed lengthwise thereof so as to be substantially V-shaped or U-shaped in order to fit over the edge of the box form. This strip is fed inward and tilted and after being tilted so that it will assume a proper position relative to the edges of the box and the anvil or former about which it is bent according to the shape of the box, the strip is then cut off the proper length. The strip is then fed forward on one side of a substantially rectangular anvil having a shape corresponding to the shape of the open end of the box and until the said strip meets the anvil, when the jaws into which the strip has been previously fed by engagement with the former or anvil will bend both ends of the strip on opposite sides thereof making the same substantially U-shaped. A second pair of jaws engages the free ends of the binding strip and forces the same on the remaining side of the anvil and causes one end of the strip to overlap the other. The shooks of which the box body is made are placed in two magazines located adjacent to one end of the machine, and these shooks are automatically fed upward in position to be removed therefrom. A reciprocatory and rotary pneumatic device is provided for this purpose and this device is automatically controlled so that the shooks will be picked up first from one magazine and then from the other so that the shooks as thus picked up will lie crosswise and at substantially right angles to each other. The pneumatic device discharges the crossed shooks into a rotary carrier or turret. A movement is given to the carrier and this places the crossed shooks in the path of box-forming mechanism, and at the proper time this mechanism operates to form the shooks into box form and carries the box from above the carrier and forces the upper edge thereof into the binding strip. The binding strip is then pinched on to the shooks thus holding the box shooks permanently together in box form. Mechanism is provided for stripping the box and causing the completed box to be deposited into the carrier, and the carrier as it feeds new shooks crosswise to the die mechanism conveys the completed box into position to be discharged. The completed box is forced out of the carrier into a chute and properly stacked and may be removed in any desired way. The binding metal is usually of tin and is in the form of a narrow strip, as 10, Figs. 1 and 7, and said metal strip may be supported as a roll or reel or otherwise convenient to the machine and passes to a suitable feed mechanism 11. This feed mechanism, Figs. 1, 2, 5, 6 and 7, is shown as having two feed rolls 12 and 13. The feed roll 12 is held to a shaft 14 and the feed roll 13 to a shaft 15 both of which extend transversely of the machine frame 15$^a$ at the upper portion thereof and at one end of the machine. On the shaft 14 is a gear 16 which is in mesh with a gear 17 held to the shaft 15 by which the two feed rolls 12 and 13 may be rotated in unison. The shaft 14 is mounted upon an arm 18 which is pivoted at 19 to the machine frame 15$^a$, and held to the upper end of this arm is one end of a spring 20, one end of which, as 21, is secured to the machine frame 15$^a$ and the other end has a thumb nut 22 held thereto by which the tension of the spring 20 may be varied, the said spring serving to hold the feed roll 12 in yielding engagement with the feed roll 13 to compensate for the various thicknesses of the tin binding strip which at most would not likely be very great.

A bevel friction wheel 23 is secured to the shaft or stud 15, and adapted to engage the beveled surface thereof is a second bevel friction wheel or gear 24. The friction surface of these wheels may be of any suitable material. The wheel 24 is clamped and rigidly held to a thimble or bushing 25 between the washer 26 and flange 27 of the bushing 25 by means of a nut 28. The thimble 25 is held to rotate with the shaft 29 and is keyed thereto so as to be adjustable lengthwise of said shaft, and said thimble 25 is rotatable in a sleeve 30. This sleeve is normally held against rotation in a split boss of a bracket or frame member 31. The sleeve 30 has a knurled part 32 and a threaded portion 33 to engage a threaded opening in the frame member 31, and said sleeve is held between the flange 27 and a collar 34 secured to the end of the thimble 25. By manually rotating the knurled part 32 and sleeve 30 the friction gear 24 may be moved toward or from the shaft or stud 15 and thus vary the speed of the feed rolls 12 and 13 and consequently the feed of the binding metal.

The shaft 29 is journaled in the frame bracket 31 and this bracket is pivoted at its lower end to a part of the machine frame 15ª and is held to rock with the shaft 35. At the upper end of the frame above the shaft 29 is a lug 36 and passing through this lug is a rod 37. This rod is screw threaded at one end and is provided with a thumb nut 38 adapted to engage the lug 36 and on the other end of said rod is a collar 39. This collar 39 may be held by a screw thread or otherwise to the rod 37 and interposed between said collar 39 and a free collar or washer 40 is a spring 41 intended normally to force the shaft 29 and the friction gear or wheel 24 yieldingly against the friction wheel or gear 23 to rotate the feed rolls, the tension of said spring being varied through the thumb nut 38. A sprocket wheel 42 is secured to one end of the shaft 29 and passing around this sprocket wheel is a sprocket chain 43. This chain 43 passes around a sprocket wheel 44, Figs. 1, 3 and 5, and said sprocket wheel 44 is secured to the main driving shaft 45 located at the lower part of the machine and at one side thereof. An arm 46 is pivotally held at 47 to one end of the frame and on the outer end of this arm is an idler roll 48 which is adapted to engage the sprocket chain 43 and serves to take up the slack and to permit proper tension to be given to the chain during the swinging movement of the shaft 29. By this means the binding metal may as a strip be fed forward positively and properly and at the desired speed.

To bend the metal binding strip lengthwise and form it substantially V-shaped or U-shaped in order that it may fit properly over the upper edges and around the box when the latter is formed, I provide what I term forming mechanism 49 arranged at the upper portion of the machine immediately adjacent to the feed mechanism 11. This forming mechanism, Figs. 1, 2 and 8 to 12, may be variously constructed. As shown a bar or member 50 is secured by bolts 51, or otherwise, to the upper part of the machine frame, and said forming bar or member may have a limited adjustment by the bolts 52. At intervals along the bar 50 the machine frame 15ª is cut away, as at 53, and in such cut-away portion and held to the bar are brackets 54. These brackets 54 are secured to the bar 50 by screws 55, or otherwise, and each bracket is formed by two upright parts or portions 56 which are connected by an integral part 57. Two levers 58 and 59 are each pivoted, as at 60, between the bracket of parts 56 and on the lower end of said levers 58 and 59 are guides 61. These guides 61 are bar-like in form and are each cut away at their inner edge and one of said bars is movable with the levers 58 and the other with the levers 59 when said levers are moved on their pivots as will be presently described. An adjustable cap member or part 62, Figs. 9 to 12, has pins 63 extending into openings in the guides 61. Each of the adjustable members 62 has a slot 64 through which passes a vertically arranged bolt 65 to permit adjustment of said adjustable members and the guides carried thereby on the lower part of the levers 58 and 59, said members 62 having upwardly extending angular portions 65ª. A bolt 66 passes through a slot 66ª in each plate and said bolt has a threaded end engaging a threaded opening in one of the levers to adjust each cap plate 62 and coöperating guide 61. The upper ends of the levers 58 and 59 are connected by links 67 to a centrally arranged stud 67ª forming a toggle lever connection and on the stud 67ª are boxes 68 which are adapted to move vertically in slots 70 in the upper end of the parts 56 of the brackets 54 and serve to guide the stud 67ª vertically in the brackets and to force the lower end of the levers inward to carry the guides 61 toward the forming bar 50 or outward according to the direction of movement of the stud 67ª.

A rock shaft 71 is held at the upper part of the machine and pivotally mounted on said shaft are arms 72 the outer ends of which are provided with slots 73 to receive boxes 74 carried by the shaft or stud 67ª so that when the arms 72 are rocked, a downward or upward movement will be given to the shaft 67ª and through it move the levers 58 and 59 on their pivots. From each of the arms 72 projects a lug or part 73ª and under said part 73ª is a spring 74ª fitting around the reduced end of an adjustable screw 75 which is located in a recess in a part of the machine frame so that by adjusting said screw the tension of the spring 74ª and consequently the pressure on the part 73ª may be varied. These springs tend normally to force the outer ends of the arms 72 and the stud 67ª downward, and through the levers 58 and 59 force the guides 61 inward. To raise the arms 72 and force the same against the action of the springs 74ª of the arms 72, I provide a plurality of arms 76, one for each spring 74ª, and each of said arms 76 is fixed to the shaft 71 and has an angular portion 77 in which is a screw 78, which when the shaft 71 is rocked will engage the projecting part 73ª of each pair of arms 72 and cause the part 73ª to be forced downward against the action of the spring 74ª. The shaft 71 has an operating arm 79 fixed thereto, and pivotally held to the outer end of said arm is a connecting rod 80, the lower end of which carries a trundle adapted to be operated by a cam 81, Fig. 1, which is held to rotate with the main driving shaft 45. The rod 80 may be provided with a turn-buckle to lengthen or shorten the same, as shown at 82 in dotted lines in Fig. 1, and said rod when the shaft 45 is rotated will oscillate or rock the shaft 71 and through the mechanism already described force the guides outward or permit the guides to be moved inward through the springs 74ª to properly aline and guide the binding strip preparatory to the same being formed or bent V-shaped lengthwise of said strip. The purpose of this centralizing mechanism is to center and straighten edgewise binding wire or strip of varying width and which may be curved or twisted throughout its length. These inaccuracies are liable to occur in a binding made by rolling or flattening a round wire, though where a ribbon of substantially uniform width is used, as where the binding is made by slitting a wide ribbon, the guides and some other features may be dispensed with and a more simple mechanism employed.

Under the guides 61 and extending lengthwise under the bar 50 in a vertical line therewith is a forming bar 83. This bar 83 has a tapered upper edge substantially V-shaped in form and corresponds to the shape of a recess 84 in the lower edge of the bar 50. The bar 83 is secured to a cross-head 85 by means of the screws 86 or otherwise, and said cross-head 85 is adapted to be moved vertically in the guides 87 of the machine frame. The cross-head is provided with lugs 88, Fig. 1, in which is a shaft 89, and connected to the shaft are rods 90 located adjacent to the ends of the cross-head, and these rods are connected to rock arms which have trundles on their outer ends that are engaged by cams 91 secured to the drive shaft 45, and said rods may be adjustable by means of turn-buckles 92 to properly adjust the cross-head and the forming bar 83 carried thereby. As the drive shaft is rotated the cross-head will be reciprocated and such reciprocation will force the upper edge of the bar 83 into the recess 84 of the bar 50 to bend or form the binding strip lengthwise in substantially V-shaped form.

The binding strip is fed forward by the mechanism 11, and interposed between the forming mechanism just described and said feed mechanism 11 are a pair of rolls 93 and 94. These rolls, Figs. 1 and 7, are held to studs projecting outward from the machine frame and said rolls serve not only to guide the strip properly to the forming mechanism but also serve to cause a loop to be formed in the binding strip, as at 95, Fig. 7, in order to provide sufficient material to be fed forward for the lengthwise bending of the strip without stopping the feed from the reel or roll and also to permit the strip to be held stationary during the lengthwise bending without affecting the rotary movement of the feed mechanism rolls 12 and 13. A second feed mechanism is arranged adjacent to the lengthwise forming mechanism and this feed mechanism is operated in such a way and is so constructed that it will advance the formed strip just sufficient to make a strip of a length corresponding to the size of the box to be formed. This mechanism 96, Figs. 1, 13 and 15, has two rolls 97 and 98, the former being mounted on shaft 99 and the latter on shaft 100. The roll 97 is provided with a groove 101 formed in an annular ring which is held by screws 103 between a disk 102 and the body portion of the roll, or the said roll may be otherwise constructed, while the roll 98 has a disk-like member forming an annular projecting rib 104 adapted to fit into the groove 101. The groove 101 and rib 104 are shaped according to the formation of the binding strip and are adapted to positively hold the same between the surfaces of said rolls. The roll 97 is held to a gear 105, and the roll 98 is held to or formed as a part of a gear 106 which gears intermesh and serve to rotate the two rolls in unison. The shaft 99 is supported by arms 107 pivotally held to a stud 108 on the machine frame, and the roll 97 may be held in engagement with the roll 98 by a spring 108ª secured at one end to one of the arms and at its other end to the machine frame. To positively drive the rolls and to time the same with relation to other parts of the machine any suitable means may be employed. As shown the roll 98 has a projecting annular rib 109 and adapted to engage said rib are friction dogs 109ª forming a part of a friction clutch 110. The dogs 109ª have slots or recesses to span the rib 109 and have their lower ends loosely held in notches in a collar 111 which is mounted to rotate on the stationary shaft 100. Pins 112, one for each dog, project radially from the collar 111 and held to each pin is a spring 113, one end of which connects with the dog tending to hold each dog in gripping contact with rib 109 in a position ready to move the wheel 98 through the rib 109 in one direction, but will allow a free return of the dogs. The collar 111 is integral with a gear 114 and serves as the hub therefor, and when the gear is moved the dogs will move the feed wheels through the dogs positively gripping the rib 109, while the dogs become disengaged when the gear 114 and collar 111 are moved in the opposite direction. The gear 114, Figs. 1 and 13, is in mesh with a rack 115, the said rack being held to move vertically in the guides 116. The guides may be attached to the frame or formed as a part thereof, and passing through the guides and connected to the rack is a rod 117. This rod 117 is connected to a rock lever 118 which carries a trundle 119. This trundle is operated by a cam 120 on the drive shaft 45 to reciprocate the rack 115, a spring 121 being provided to force the rack downward and to keep the trundle against the periphery of the cam 120. A projection 122 is carried by the rack 115 and in this projection is a screw 123, the lower end of which is adapted to engage a part 124 on the guides 116. The purpose of the projection 122 and the stop 124 is that the rack may be operated just the desired distance by the cam 120 in order to rotate the feed rolls properly to feed just the right length of strip. It will be seen that the screw 123 by its engagement with the stop 124 will limit the downward movement of the rod 117 according to the adjustment of the screw, while the cam always raises the rack to the same height, thus a very exact feed may be obtained.

The binding metal as it is fed forward through the forming mechanism and after it passes the feeding mechanism 96 is tilted in order that it may be positioned properly with respect to the upper edges of the box, and in order that the same may be properly held to receive the edge of the box when formed. The binding strip both before reaching the feed mechanism 96 and afterward is suitably guided as it is fed forward and said guiding means may be in the form of plates or bars 125 and 126. These bars may be divided into two parts extending on opposite sides of the feed rolls 97 and 98 and the said bars form a recess or groove 127 between them. This groove on one side of the feed rolls is tapered and is of the form shown in Fig. 17. At the side opposite the feed rolls the said bars become tilted or arranged at an angle and the groove in this case may be circular for a part of its length as at 128, Fig. 18, and large enough to guide the material. At a point farther inward, as indicated by arrow XIX, Fig. 1, the said bars are still in a tilted position and the groove changes to that shown in Fig. XIX, as at 129, and this groove extends to a point adjacent the tilting rolls 130 and 131, the said tilting rolls being best shown in Fig. 16. These rolls are arranged at an angle with respect to a vertical plane, the roll 130 being grooved while the roll 131 has a tapering peripheral surface adapted to fit the groove 130 so that the formed metal will be gripped by said rolls and properly positioned thereby. The roll 131 rotates on a stud 132 carried by a part of the machine frame, and the roll 130 rotates on a stud 133 carried by an arm 134 which is pivoted at one end to a part of the machine frame, as at 135, Fig. 1, and the free end is normally forced toward the roll 131 by a spring 136. The tilting of the formed metal binding is important, otherwise it cannot be successfully bent about the corners of the anvil or former to receive the box body as will be hereinafter explained. The binding must be so positioned that it will not capsize while being bent box-form, in which case it will not make a rim that will open downward to properly receive the top edge of the box body but will either cause one side of the binding to open outward or to move inward while being bent about the anvil.

After the binding strip has been formed and tilted and fed forward far enough to give the length of the strip required, it is necessary to cut the strip off at the proper point and hold the strip severed from the stock. One means for severing and holding the stock is shown in more or less detail in Figs. 20 to 25. As shown the strip is fed forward along a groove 137, Fig. 23, conforming substantially to the shape of the strip, and said groove is formed in one face of a bar 138 carried by a reciprocatory frame-bar 139, the strip of binding metal before reaching the bar 138 being made to pass between two jaws 140 and 141. The jaw 140 carries a substantially V-shaped tooth or engaging part 142 which is clamped between a part of the jaw and a cap plate 143 by a screw 144. This gripping part 142 of the jaw 140 is opposed to the gripping member 145 carried by the jaw 141. The gripping part 145 is in alinement with a part 142, and of the same length and both gripping parts are arranged at an angle corresponding substantially to the tilted position of the binding strip, the part 145 being slidingly held in a recess 146 in the jaw 141. A rod 147 connects with the part 145 and on the outer end of said rod are nuts to limit the downward movement of the part 145 relatively to the rest of the jaw 141, and arranged around the rod is a spring 148 one end of which engages the under side of the recess portion of the jaw or of a separate cap plate 149 and the other end of said spring is arranged in a recess in the upper portion of the clamping or gripping part 145. A knife 150 is held in the jaw 141 adjacent to the gripping part 145. This knife is held against movement by a screw or bolt 151 and another screw 152 located at one edge of the knife by which the knife may be properly positioned. The knife has an edge to properly cut the strip and serves as one member of the shearing means, and the clamping part 142 serves as the other member of said shearing means, the said part 142 being adjusted through a screw 153. The jaws 140 and 141 are constructed to move toward each other and during this movement the binding strip is cut transversely, the purpose of the groove 154 of the knife and the groove 155 in the clamping member 145 being to prevent the formed strip from having its shape changed during the cutting operation. The principal purpose of forcing the block or gripping part 145 into engagement with the block gripping part 142 is to reform that end of the metal binding strip so that when the other end is lapped or forced into it the two ends will fit nicely and neatly, otherwise one overlapped part will project considerably above the other when the rim is crimped on the finished basket. Having the two ends meet properly makes it possible for the hook to hold the lapped ends of the binding strip, though in addition to these important features, the clamping of the strip between the parts 145 and 142 makes it possible to still cut the material well even when the knives are quite dull. The jaw 141 may be formed as a part of a lever 156 which is angular in form, and the jaw 140 is carried by a lever 157 of a bell-crank type and both levers are pivoted to a stud 158. The levers at their lower ends extend on opposite sides of the pivot and are connected by links 158$^a$ to a vertical movable rod 159 forming a toggle joint connection, so that by reciprocating the rod 159 the jaws 140 and 141 will be brought toward each other and in doing so the metal strip will be clamped between the parts 142 and 145 and then the knife 150 will cut the strip the proper length, the length of the strip being determined by the feed as previously described. The rod 159 extends downward and is connected to an arm which carries a trundle at one end thereof, the said trundle being engaged by a cam 160 on the main drive shaft 45 to operate said rod as the said shaft is rotated. The strip as it is fed along the bar 138, Fig. 23, and in the groove 137 is held from falling out of said groove by a shutter or bar 161. This shutter is carried by a beam or bar 162 and this beam is adapted to rock with a shaft 163. The shaft 163 is held to the beam 162 and rocks in the bearing or brackets 164 which are fastened to the machine frame and are located at both ends of the shutter and therefore do not move with the reciprocatory frame bar 139. The bracket 164 nearest the transverse cutting knife has a strip or guide held to the inner edge thereof provided with a groove to receive the binding strip, while the other bracket 164 is not provided with such a guide. The beam 162 carries an integral arm 165, and this arm at its outer end is connected to a rod 166. The lower end of the rod 166 is pivotally held to a pivoted arm or lever which carries a trundle at one end and which is engaged by a cam 167, Fig. 1, arranged on the main drive shaft 45, so that as this latter shaft is rotated the cam will cause an oscillatory movement to be given to the shutter bar 161 to release the binding strip held in the bar 138.

A reciprocatory frame 168 to which the bar 139 is held carries the severed binding strip to an anvil or former 169, Figs. 5 and 26 to 36, by which and the mechanism to be hereinafter described, the severed metallic strip is bent around all four sides of the anvil and the ends of the binding strip made to overlap, the binding strip as a whole being held in position to be applied to the box when formed. This may be accomplished in various ways. In the construction shown, the reciprocatory frame 168 has levers 171 pivoted to studs 172 at opposite sides thereof, and one end of each of these levers is adapted to engage a stop 173, in this case a bolt, to limit its movement in one direction and at the opposite end of each of said levers is pivoted a bending jaw or element 174. Each bending jaw is pivoted at 175 to its coöperating lever 171 and said jaw in its normal position, that is in the position shown in full lines in Figs. 5 and 26, receives the binding strip as it is fed forward. Each jaw has a relatively large bearing surface or part 176, in one face of which is inserted a bar 177 forming a continuation of the bar 138 of the reciprocating frame bar 139, said bar having a groove 178 to receive the binding strip and made to conform somewhat to the shape of said strip. A finger 179 is pivoted at 180 to a part of the reciprocating frame 168 on each side thereof and each finger has one end adapted to close a part of the groove 178 of the binding jaw so that the strip will be held to move with the jaw and frame. These fingers are normally pressed in one direction by a spring 181, and said fingers having a projecting portion 182 which is adapted as the frame is moved forward toward the anvil or former 169 to engage a fixed cam 183 at the proper time to release the binding strip and permit an independent movement of the bending jaws 174 while bending the strip about the anvil, the action of the finger after it is released being shown in dotted lines in Fig. 29. Each bending jaw 174 is pivoted at 184, to the bar 139 of the frame 168 and has a recessed portion, as 186, adapted as the frame 168 is moved inward to fit about a boss or socket piece 187 arranged at the corner of the anvil 169 and which serves as a pivot for each of said jaws to swing about the anvil parallel to the sides 188 of said anvil to force the binding metal against the same. There are two jaws 174, one at each side of the frame 168 and these jaws are similarly constructed and operate in a similar manner about the anvil 169 and a description of one therefore will answer for the description of the other, the operation or movement of the frame 168 with the jaws 174 being set forth more clearly in Figs. 26 to 29. Each jaw 174 is normally held in a certain relative position to that of its coöperating lever 171 and at the same time it should be yieldingly held, otherwise the jaw could not be forced at substantially right angles to the anvil to bend the binding strip. To secure this, a spring 189 is provided, and this spring has one end secured to a part of each jaw 174 and its other end is held to a part of the pivoting stud 175 which is held against movement in the end of the lever 171, the reciprocating frame 168 being provided with a slot 190 to permit a relative movement of the jaw 174 and the levers 171 as the reciprocating frame 168 moves inward.

The inward movement of the reciprocating frame 168 may be accomplished by a rocking lever 191, Figs. 1 and 5, the upper end of which is connected by links 192 to lugs projecting out from the frame 168. The lower end of the lever 191 has a trundle and is operated by a cam 193 on the main drive shaft 45, the said lever 191 being pivoted at 194 on the machine frame. As will be seen when the shaft 45 operates the cam 193 will rock the lever 191 on its pivot and at the proper time will force the frame 168 inward. The bar 139 and jaws 174 carrying the binding strip will move forward until the recessed portions 186 engage the bosses 187 located at the corners of the anvil 169 where it is restrained against further inward movement, and on further movement of the frame 168 independent of the bar 139 the jaws 174 will be forced about the sides 188 of the anvil or former bending or folding the binding strip about the same. During this inward movement of the frame the fingers 179 will be released from the binding strip before the bending actually takes place, a guide or plate 195ª, Fig. 5, being arranged in the path of movement of the free end of the binding strip which projects beyond the outer end of the jaws 174 and serves simply to guide the end of the strip while the latter is being folded or bent about the anvil.

The anvil, Figs. 26, 38, 41, 42, 43, 53 and 54, is substantially rectangular in form and is carried by a part of the box-forming mechanism to be hereinafter described, and said anvil conforms to the general shape of the open end of the box to which the binding strip, when completely bent about the anvil is applied to hold the parts of the box together. The particular form of box to be made in the machine shown is square, though the shape may vary, and when square the shape of the anvil is also square. The anvil or former 169 has corner or socket pieces 187 for the front or initial folding and corner pieces 196 and 197 for the back folding or final folding of the strip. These corner pieces may be of hard metal and each has a socket portion to fit its coöperating bending jaw and under each socket portion is a substantially V-shaped part 198 which is intended to give a sharp bend to the binding strip at the corner thereof and to close the corner in order that the package may be substantially square when formed, and said corner pieces are so made that they will not interfere with the placing of the strip upon the box when the latter is formed as will be hereinafter understood when the box forming mechanism is described, the form of the strip when bent being shown in Fig. 65. To bend the strip on the opposite face of the mandrel or back thereof, it is necessary to force the two ends of said strip inward and it is also desirable that the said ends may be made to overlap to provide the proper finish for the article when completed, and to secure this, I provide two oppositely movable folding mechanisms each carrying a pivotal jaw so timed and operated that it will force the free ends of the binding strip about the anvil and at the same time cause them to overlap. This final folding mechanism is shown best in Figs. 30 to 37. There are two rear folding mechanisms 199 and 200. The construction of the folding mechanism 199 is substantially the same as the folding mechanism 200 except as to certain details, and particularly the movement of one of the jaw members and its operation and in so far as the parts correspond, I shall employ the same reference numerals and the explanation given as to the operation of the mechanism 200 is also applicable to the operation of the mechanism 199 except as to the differences particularly referred to. The mechanism 200 acts somewhat prior to the mechanism 199 and each of said mechanisms comprises a cross-head 201 suitably guided in the frame, and on this cross-head is held a lever 202 which is pivoted at 203 to the cross-head, and at one end thereof is a stud 204 on which is a trundle 205 which moves in a cam slot 206 on the machine frame. The outer end of the lever 202 has a bending jaw 207 pivoted thereto. A bolt 208 serves as a pivot, and around this bolt is a spring 209 which yieldingly holds the jaw 207 against pivotal movement. The jaw is normally held with its strip-receiving face at right angles to the direction of movement of the lever 202 and in position to engage one of the free ends of the binding strip. The jaw 207 comprises two members 210 and 211, the latter being the one which is pivoted to the lever 202. One end of the member 211 has a laterally projecting lug, as 212, and this lug is adapted to engage a stop 213 on the lever 202, and on the side opposite the toe or part 212 is a projection 214 which is connected by a spring 215 to a lug 216 on the member 210. The purpose of the spring 215 is to hold the members 210 and 211 in their proper relative position but the spring will permit a relative movement between the same through the pivot 217 which serves to hold the two members 210 and 211 together. The jaw member 210 has a recess 218 which is adapted to engage the corner piece 196 of the anvil 169 in a manner quite similar to the jaws 174 and which jaw member is adapted to swing about the rear face or back 219 of the anvil. The cam slot or groove 206 inclines upwardly at the rear so that on the rearward movement of the jaw 207 the said jaw will be forced downward so that the free end of the binding strip while being folded or formed by the jaws 174 will be permitted to move free of the jaws 207 and on the forward movement of the jaw to fold or bend the strip it will be again elevated by reason of the cam groove 206 to a position to cause the strip to enter the opening 220 formed in the face of a bar 221 extending across the member 210 and normally at right angles to the path of movement of the cross-head 201.

The main difference between the bending jaw mechanisms 199 and 200 is that the former is constructed so that it will permit the end of the metallic binding strip on that side to be forced downward below the end of the binding strip of the mechanism 200 and then be forced upward under the strip in order that the ends may overlap. To secure this result, the outer member 210 of the mechanism 199 has a part 222 which is held as a part of and moves with a downward and upward swinging forward portion 223 forming the bending portion of the jaw. In the part 223 is a bar 224 having a groove 225 for the reception of the end of the binding strip and this part of the jaw is pivoted about a horizontal axis at 226, as shown in dotted lines in Fig. 33, and is guided in its vertical swinging movement by a projection or rib 227. The part 227 has a bolt 227ª passing therethrough around which is a spring 228 held between the part 227 and nuts 229 on said bolt. A cam 230 carried by a part of the binding strip pinching mechanism to be hereinafter explained is arranged in the path of movement of the jaw as it is forced inward, and the forward portion 223 of the jaw is forced downward against the tension of the spring 228 and in doing so carries with it the free end of the binding strip. As the jaw swings in the arc of a circle as indicated in dotted lines in Fig. 33, the said jaw will pass along under said cam 230 and until said end passes out of the path of the cam when the spring 228 will force it upward again and in doing so will place the bent end of the strip under the preceding strip end which has been bent by the mechanism 200 and in alinement with said end causing the ends of the binding strip to overlap. As the end of the strip is forced up by the spring 228 it is forced into the grip of a spring clip 231 which engages under the binding strip and holds the same to the anvil. The corner 197 of the anvil 169 is slightly different in construction from that of the other corner pieces and this particular corner is shown best in Figs. 53 and 54. The construction differs in that there is a cutaway part 232 under the socket portion 197 and above the V-shaped corner 198. The purpose of this cut-away part is to provide clearance for a rearward movement of the mechanism 199 a certain distance to move the part 222 out of the path of the cam 230 so that said part can be returned to its normal position without being again forced downward, the corner of the recess 218 of the lapping means 199 being rounded to allow this rearward movement. During this rearward movement the several members of the jaw by their springs will be restored to their normal position or such as shown in full lines in Fig. 33.

The movement of both of the cross-heads 201 by which the bending jaws are forced inward and outward is secured by substantially the same means. The cross-heads 201 are each connected to one end of a rod or link 233 and each link is connected to one end of a rock arm 234 secured to a shaft 235. The shafts 235, Fig. 1, have arms 236 one of which is connected to a rod 237 and the other to a rod 237ª and both rods are connected to links 238. The links 238 are connected to arms 239 and 239ª pivoted to a part of the machine and said arms carry trundles which are engaged by cams 240 on the main drive shaft 45. The cam 240 for the mechanism 199 is located near the rear end of the machine and the cam for the folding mechanism 200 is located substantially midway of the machine and said cams are so positioned that one will operate the mechanism somewhat in advance of the other, each rod 237 and 237ª being provided with a turn buckle 241 to adjust the length of the rod in order that said mechanisms may be operated properly and timed with respect to the movement of other parts of the machine. It will be seen that as the shaft 45 is rotated, the cams 240 will move the rods 237 and 237ª up and down and by reason of the position of the arms 236 the cross-heads 201 will be forced inward until the jaws engage the corners of the anvil 169 at which time the said jaws will engage the free ends of the binding strip and will bend the same about the anvil and cause the ends to overlap as already described.

As the binding metal is being formed and bent so as to be held about the anvil, and when the invention is applied to a machine for making boxes, the shooks of which the box body is made are automatically or otherwise fed to the box-forming mechanism to be presently described. The shooks may be held in one or more magazines and are fed to a suitable carrier 242 so as to lie crosswise therein, and this carrier conveys the shooks to a position under the formed metal binding and between the punch or plunger mechanism 243 and the die mechanism 244 of the box-forming mechanism. The plunger mechanism is normally located above the carrier, and the die mechanism is located under the same, and the latter mechanism is of such form that it may be moved upward through one of the receivers of the carrier in which the crossed shooks are located, both plunger mechanism and die mechanism being adapted to move toward each other.

The plunger mechanism 243 comprises a head 245 and a tubular stem portion 246, the upper end of which has a collar 247 secured thereto. This plunger sleeve is provided with a key-way which is engaged by a key 248 held to a part of the machine frame so that the said sleeve may reciprocate up and down and be held against rotary movement, and interposed between the boss 249 and the collar 247 is a spring 250. A rod 251 is movable independently within the sleeve or rod 246 and on the lower end of this rod is a pressure foot 252. This pressure foot is substantially rectangular in form and corresponds to the size of the bottom of the box to be made. The pressure foot is held rigidly to the lower end of the rod 251 and said pressure foot is adapted to be forced downward independently of the plunger of which it forms a part, and is adapted to rest upon the shooks in the carrier. At this time the die mechanism 244 is forced upward under the shooks to meet the pressure foot and the pressure foot and the die mechanism move together to remove the shooks from the carrier to a point above the same.

The die mechanism, Figs 55 to 58 and 59 to 62, comprises a frame or head 253 which is secured to the upper end of a rod 254, said rod being vertically movable in a manner to be hereinafter described. The rod 254 has a cap-plate 255 secured thereto by screws or otherwise and said plate is substantially rectangular in form and is provided with downwardly extending ribs 256 forming pivots for the yielding plates 257. There are four plates 257 and each of these plates has a portion 258 which extends within a recess or space formed under the cap-plate 255 and said plates are each normally forced upward by two or more springs 259, the said cap-plate 255 and the yielding plates 257 serving to form a support for the bottom of the basket while being folded, and said plates 257 allow for unevenness in the length of the shooks. This function of the plates 257 which allows for unevenness of the length of the shooks is desirable because the binding metal is narrow and it is necessary that the upper edges of the shooks be in the same plane. If, therefore, one shook is longer than the other, as soon as the upper edge or edges thereof engage the binding, the folded sides of the longest shook will be forced downwardly and as the bottom of the box at the fold rests on said plates, the latter being yielding, will let the bottom lower thus compensating for the uneven lengths of the shooks and permitting the upper edges to be squared. There are four folding sides or plates 260 and these plates are substantially the same width as the shooks and are intended to force the ends of the shooks upward while held between the presser foot 252 and the cap plate 255 with its yielding members 257, and said folding members coöperate with the plunger and serve to form the shooks box-shape. The sides 260 are each provided with slots 260ª, Fig. 55, in which boxes or bushings 261 on the studs 262 are adapted to slide. These studs 262 and bushings 261 are carried by a pivotally held block 263. There is a block 263 for each folding plate or side member 260 and these blocks are pivotally held to shafts 264 and are adapted to move upward with their coöperating folding sides or plates, and said blocks and the folding plates in their upward movement have a slight relative movement with respect to each other. Each block has a shaft 265 and pivotally held to this shaft is a lever 266, shown in detail in Fig. 56, and each lever has jaws 267 formed with slots 268 adapted to receive blocks carried by studs 268ª on each of the folding side plates or members 260. Each of the levers 266 has and arm 269 projecting inward therefrom on the outer end of which is a stud 270 and on this stud is a trundle 271. The trundles 271 are adapted to engage cam grooves 272 arranged in a part of the die head 253. The inner ends of each folding plate or side bear against the outer edge of the yielding bottom members 257 and said bottom members have parts which enter recesses in the ends of the said plates to prevent lateral movement and said folding side plates and bottom plates or members form a joint which will fold the shooks to form a substantially square bottom as best shown in Figs. 61 and 62. The folding side plates have parts fitting into recesses in the blocks 263 to further guide the same in their upward movement, said recesses being located in the bearing portion 273 of said blocks. A spring-pressed pin 274 is held in an opening located adjacent to the recesses, and said pins are adapted to bear against the folding plates to permit the latter to yield slightly when folding the shooks into box shape. The pins 274 are pressed outward by springs and these may have their tension varied by nuts 275 against which one end of the springs rest. Each of the blocks as well as the levers 266 through the stud or shaft 265 is connected by a link 276 to a vertically movable frame 277. This frame may be rectangular or circular in form and has cut-away portions to which the links 276 are pivoted, and said vertically movable frame is held to slide between guides forming a part of the machine frame or as a part of the supporting frame held within an opening of the main machine frame. The lower part of the vertically movable frame member of the die mechanism is provided with portions 277ª to which are connected the ends of the links 278. There are two links 278 and the lower ends of said links are connected to levers 279 which are pivotally held on the shaft 280, and projecting outward from said shaft is an arm 281. The arm 281 is connected to a rod 282 and this rod may be adjustable through a turn buckle 283. The rod 282 is pivotally held to an arm 284, one end of which is pivoted at 285 to a bracket 286 secured to a part of the machine frame, and on said lever is a trundle 287 which enters a groove in a cam 288 located on the main drive shaft 45. As the drive shaft is rotated the arm 281 will raise the links 278 and through the frame and links 276 cause the side folding plates 260 and blocks 263 to move upward, the levers 266 being guided at their free ends by means of the trundles or rollers 271 engaging the cam grooves in which they work as already described. The entire die mechanism or head is moved upward and this is accomplished through links 289 which are pivotally held to a part of the die head 253, and these links are pivoted at their lower ends to arms 290, the latter being held to the shaft 280. An arm 291 is also held to the shaft 280 or projects outwardly as a continuation of one of the arms 290 and on the outer end of this arm is a rod 292 which may be adjustable lengthwise by a turn buckle 293. The lower end of the rod 292 is pivotally held to an arm 294 which is pivoted at one end to the shaft 285 in a manner similar to the arm 284 and on the arm 294 is a trundle or roller 295 which is adapted to be operated by a cam 296 also secured to the main drive shaft 45. It will be seen that as the main drive shaft is rotated and the cams 288 and 296 are rotated, an upward movement will be given to the entire die head and during this movement a relative movement will be imparted to the reciprocatory frame so as to move the folding plates or sides 260 on their pivots to fold the sides of the box and during the upward movement the box thus folded will move with the presser foot 252, the said presser foot being operated positively by the same mechanism by which it is lowered or forced downward to initially engage the surface of the shooks while held in the transfer mechanism or not as desired.

The upper end of the presser foot rod 251 is provided with a collar 297 which is held thereto by a thread and a nut 298, locking it in position, and engaging the collar are studs 299 projecting inward from the bifurcated end of a lever 300. This lever 300 is pivoted at 301 to a bracket 302 extending upward from the frame, Fig. 1, and the outer end of the lever 300 is connected to a two-part rod 303. This two-part rod is constructed to have a yielding connection between the parts thereof as by a spring 304 so that the lever 300 may be moved on its pivot in such a way that when the presser foot 252 engages the shooks, a yielding connection may be provided. The rod 303 at its lower end may be connected to an arm fastened to a shaft and held on said shaft is a lever which is operated by a cam or otherwise to reciprocate said rod and to move the rod and presser foot upward and downward.

The sleeve 246 carries at the lower end thereof the plunger head 245 which may be formed integral therewith, and said plunger head has a recessed portion to which the anvil serving as a former for the binding strip is secured, the said plunger portion extending slightly beyond the anvil so as to provide a bearing surface for the upper part of said binding strip. At each side of the plunger head is pivotally held a former plate or member 305. These former plates, Figs. 38, 61 and 62, have a straight surface 306 against which the side of the box when formed by the dies is adapted to rest, said plunger being adapted to fit within the box, and each former plate 305 has an inner hooked part 307 substantially midway thereof which is adapted to fit over a rod or stud 308 to adapt each side to move with the rod as a pivot and to conform to the shape of the box. Each former plate has projecting parts to engage a part of the plunger head, the corners of which are extended. Each former plate has a recess at the upper part thereof to receive the head of a screw 309 the threaded end of which engages a part of the plunger head, said screw serving to limit the outward movement of the upper portion of the former plate. At each side of the screw 309 is a spring one end of which is located in a recess in the former plate and the other end fits about the head of a screw 310 by which the tension of the spring may be varied, the springs serving to yieldingly force the upper ends of the plunger former plates outward. By pivoting the said plates in the manner shown, they will conform to the angle of inclination of the box and will form a bearing surface for the inner portion of the box when the die-forming plates 260 are forced to bend the shooks into box form, so that the said shooks as they are bent are properly held ready to receive the binding strip which is already supported around the anvil located above the upper edge of the box, as shown best in Figs. 61 and 62.

As the box properly formed and held is forced farther upward by the upward movement of the die mechanism the upper edges of said box will enter the binding strip and at this time the binding strip is pressed on to the upper edge of the box to be clenched and held thereto to properly bind and hold the bent veneer shooks in box form. This may be accomplished in various ways. As one means for clenching the binding strip to the box form, I provide a plurality of clenching blades 311 which are secured to the lower end of the rocking levers 312, 313, 314 and 315, shown in Fig. 40. Each blade 311 has a relatively long surface, and each blade is provided with a plurality of slots. Passing through the slots of each blade are bolts 316, the threaded ends of which are secured to the lower end of one of the levers, and at the rear of each lever is a plurality of screws or bolts 317 by which the clenching blades 311 may be adjusted. There are plates 311ª, one for each clencher blade 311 and there are two or more spring plates 317ª which tend to force each plate past the edge of its coöperating clenching blade to form a ledge for the binding strip to rest on while being clenched to the box body. When the rocking levers 312 to 315 are moved inward, the plates 311ª will engage the side of the box body and will yield to allow the clenching blades 311 to continue inward to bind the metal strip about the box body.

The levers 312 to 315 have arms 318 extending upward therefrom and these arms are yieldingly held together in pairs by means of diagonally arranged springs 319. Each lever 312 to 315 has its upper end provided with a recess or socket, and fitting this socket is one end of a link 320, the lower end of which fits a socket forming a pivotal connection between the upper end of the levers 312 to 315 and a vertically movable sleeve or collar 321. The collar 321 is vertically movable on the sleeve 246 and at the upper end is substantially square in form and provided with grooves in which are the slide blocks 322, the latter being secured to studs extending inward from the bifurcated end of a rock lever 323, shown best in Fig. 1. This lever 323 is pivotally held to a shaft 324 and the outer end of said lever is connected by a rod 325 to an arm 326, the outer end of which carries a trundle which engages a cam groove in the cam 327 carried by the main drive shaft 45. When the shaft 45 operates the cam 327 will oscillate the lever 323 and through the collar 321 will cause the clenching levers 312 to 315 to move on their pivot shafts carried by brackets supported on the machine frame, and this movement through the links 320 will cause the blades 311 to be forced inward to clench and bind the binding strip held by the anvil positively about the box form which has been made by the die mechanism and plunger mechanism in its upward movement, the reverse action of the lever 323 serving to move the clenching levers away from the plunger head free of the anvil. Another important result secured by the collar or sleeve 321 is that its lower end engages a shoulder on the tubular stem 246, thus pushing the anvil head 245 downward far enough to expose the anvil corner pieces and to move the same into the plane of action through which the folding mechanism moves in putting the wire rim or binding metal on to the ram or plunger. This is done during the latter part of the downward movement of the collar 321 or at the time the levers 312 to 315 are almost opened. The box is now completed but in case it should be held to the plunger when the die mechanism is lowered and to prevent the possibility of the box remaining on the plunger head, I provide a plurality of hooks or devices 328. These hooks are pivoted to opposite sides of two of the former plates of the die mechanism, and each hook has a part which is adapted in the forward movement of the die to pass over the metal binding strip and on the downward movement of the die to strip the completed box from the plunger mechanism in substantially the same way as disclosed in my pending application.

The invention will be readily understood from the foregoing description when taken in connection with accompanying drawings. Assuming the parts to be in the position shown with a sufficient stock of tin or any other coated or uncoated metal in the form of a long strip from a reel or otherwise, and the magazines supplied with veneer shooks, and the main shaft 45 rotated, the binding strip will be fed inward and will be formed substantially V-shaped lengthwise thereof, and when thus formed will be tilted by the rolls 130 and 131, after which it is cut off the desired length. The metal binding strip is moved forward to meet the forming anvil and the said strip is bent on all sides thereof by the bending jaws 174 and 210, and the said binding strip formed so that its ends will overlap as previously described, the single strip being first bent around two corners of the anvil and then around the remaining two corners. The binding strip now being held by the anvil, the shooks arranged crosswise are alined and held in the carrier 242. The presser foot 252 of the plunger mechanism is forced downward to engage the shooks in the carrier, and the die mechanism is then moved upward and during the upward movement the shooks are bent into box form. The presser foot 252 moves upward with the die mechanism and the plunger is caused to enter the box and on further movement of the die mechanism the upper edge of the box is forced into the binding strip. The clencher levers 312 to 315 with the blades carried thereby are then forced inward by the mechanism previously described, which will cause the binding strip to be bound rigidly to the box form. During the upward movement of the die mechanism, the hooks 328 carried thereby will engage the upper edge of the binding strip and will force or strip the completed box from the plunger when the die mechanism is lowered. The completed box as the die mechanism is lowered is caught by the carrier and the boxes may then be conveyed away and discharged from the machine as in my pending application.

Where the word "veneer" is used it is employed in its broadest sense and is intended to include any kind of material that may be utilized for making the box body whether such material is paper, sheet pulp or of any other character.

It will be evident that by the means herein shown and described a metallic binding may be automatically bent or folded lengthwise, cut the desired length, tilted and bent transversely to the shape of the object to which it is applied; that means is provided whereby the formed binding metal may be readily and permanently attached to an object; and that said mechanism may be so constructed that instead of a single strip being used as a binding for an object and particularly when large boxes or baskets are made, the said binding may be formed in two or more pieces and bent box-shaped so that the ends thereof will overlap.

Having thus described my invention, I claim as new and desire to secure by Letters Patent:—

1. The combination of means for supporting a long strip of binding metal in a roll-like form, means for drawing the binding metal from the roll and for providing a slack portion in said binding metal, means for positively feeding a determined length of the binding metal, means for adjusting said feeding means to vary the extent of feed, means for folding the binding metal lengthwise substantially V-shaped in cross-section, means for tilting the folded binding metal to change its position, means for cutting the binding metal transversely, means for reforming one end of the binding metal, a rectangular anvil, means for moving the cut and folded binding metal against the anvil and bending the binding metal about the anvil on three sides thereof, independent means independent of each other and movable at right angles to the first-mentioned bending means in the same horizontal plane but in opposite directions for bending the binding metal about the remaining side of the anvil and for causing the ends thereof to overlap, means for holding the binding metal to the anvil, and means for applying the folded and bent binding to an object.

2. The combination of means for supporting binding metal, means for positively feeding a determined length of the binding metal, means for adjusting said feeding means to vary the extent of feed, means for folding the binding metal lengthwise, means for tilting the folded binding metal to change its position, means for cutting the binding metal transversely, means for reforming one end of the binding metal, a rectangular anvil, means for moving the cut and folded binding metal against the anvil and bending the binding metal about the anvil on three sides thereof, independent means independent of each other and movable at right angles to the first-mentioned bending means in the same horizontal plane but in opposite directions for bending the binding metal about the remaining side of the anvil and for causing the ends thereof to overlap, means for holding the binding metal to the anvil, and means for applying the folded and bent binding to an object.

3. The combination of means for supporting a long strip of binding metal, means for positively feeding a determined length of the binding metal, means for folding the binding metal lengthwise, means for tilting the folded binding metal to change its position, means for cutting the metal binding transversely, means for reforming one end of the binding metal, an anvil, means for moving the cut and folded binding metal against the anvil and bending the binding metal about a part of the anvil, means independent of each other and movable in opposite directions one in advance of the other for bending the binding metal about the remaining portion of the anvil and for causing the ends thereof to overlap, means for holding the binding metal to the anvil, and means for applying the folded and bent binding metal to an object.

4. The combination of means for supporting binding metal, means for positively feeding a determined length of the binding metal, means for folding the binding metal lengthwise, means for tilting the folded binding metal to change its position, means for cutting the metal binding transversely, an anvil, means for moving the cut and folded binding metal against the anvil and bending the binding metal about a part of the anvil, means comprising independent parts movable in opposite directions one part in advance of the other for bending the binding metal about the remaining portion of the anvil and for causing the ends thereof to overlap, means for holding the binding metal to the anvil, and means for applying the folded and bent binding metal to an object.

5. The combination of means for supporting binding metal, means for folding the binding metal lengthwise, means for tilting the folded binding metal to change its position, means for cutting the binding metal transversely, an anvil, means for moving the cut and folded binding metal against the anvil and bending the binding metal about a portion of the anvil, and independent means including oppositely moving jaws one moving in advance of the other for bending the binding metal about the remaining portion of the anvil.

6. The combination of means for supporting binding metal, means for folding the binding metal lengthwise, means for tilting the folded binding metal to change its position, an anvil, means for moving the cut and folded binding metal against the anvil and bending the binding metal about a portion of the anvil, and independent means including oppositely moving jaws one moving in advance of the other for bending the binding metal about the remaining portion of the anvil.

7. The combination of means for supporting binding metal, means for positively feeding a determined length of binding metal, means for adjusting said feeding means to vary the extent of feed, means for folding the binding metal lengthwise substantially V-shaped in cross-section, means for cutting the binding metal transversely, means for reforming the binding metal, a rectangular anvil, means for moving the cut and folded binding metal against the anvil and bending the binding metal about the anvil on three sides thereof, independent means for bending the binding metal about the remaining side of the anvil and for causing the ends thereof to overlap, means for holding the binding metal to the anvil, and means for applying the bent binding to an object.

8. The combination of continuously moving means for feeding a metal binding strip, of means for holding the strip stationary and located adjacent to but forward of the said feeding means, means for bending the strip lengthwise, transverse cutting means, feeding means for the bent strip, means for tilting the strip, a substantially rectangular anvil, means for bending the strip on all sides of the anvil and causing the ends of said strip to overlap, and means for applying the strip to an object.

9. The combination of continuously moving means for feeding metal binding, of means for holding the binding stationary and located adjacent to but forward of the said feeding means, means for bending the strip lengthwise, transverse cutting means, feeding means for the bent strip, means for tilting the strip, an anvil, and means for bending the strip on all sides of the anvil and causing the ends of said strip to overlap.

10. The combination of continuously moving means for feeding a metal binding strip, rolls for holding the strip stationary to form a loop and located adjacent to but forward of the said feeding means, means for bending the strip lengthwise, transverse cutting means, feeding means for the bent strip, means for tilting the strip, a substantially rectangular anvil, and means for bending the strip on all sides of the anvil and causing the ends of said strip to overlap.

11. The combination of continuously moving means for feeding metal binding, rolls for holding the binding stationary to form a loop and located adjacent to but forward of the said feeding means, a second feeding means for the binding, means for tilting the binding, a substantially rectangular anvil, and means for bending the binding on all sides of the anvil and causing the ends of said binding to overlap.

12. The combination of continuously moving means for feeding a metal binding strip, means for holding the strip stationary and located adjacent to and forward of the said feeding means, means for folding the strip lengthwise, feeding means for the folded strip, means for tilting the strip, an anvil, and means for bending the strip on all sides of the anvil and causing the ends of said strip to overlap.

13. The combination of continuously moving means for feeding a metal binding, rolls for holding the binding stationary and located adjacent to and forward of the said feeding means, means for folding the strip lengthwise, a second feeding means for the bent binding, an anvil, and means for bending the binding on all sides of the anvil and causing the ends of said binding to overlap.

14. The combination of two feed rolls, means for rotating said rolls simultaneously and for yieldingly holding the same together, an arm, means for yieldingly forcing said arm in one direction, a gear movable with one of the rolls, a second gear carried by said arm, means for adjusting said latter gear to vary the speed of the feed rolls, means for rotating the adjustable gear, and means for bending the binding metal lengthwise and transversely.

15. The combination of two feed rolls, means for rotating said rolls simultaneously and for yieldingly holding the same together, an arm, means for yieldingly forcing said arm in one direction, a gear movable with one of the rolls, a second gear carried by said arm, means for rotating the gears, and means for bending the binding metal lengthwise and transversely.

16. The combination of feeding means for a metal strip comprising two feed rolls, means for rotating said rolls simultaneously and for yieldingly holding the same together, an arm, means for yieldingly forcing said arm in one direction, a gear movable with one of the rolls, a second gear carried by said arm, means for adjusting said latter gear to vary the movement of the feed rolls, and means for rotating the adjustable gear.

17. The combination of feeding means for a metal binding comprising two feed rolls, means for rotating said rolls simultaneously and for yieldingly holding the same together, an arm, means for forcing said arm in one direction, a friction gear movable with one of the rolls, a second friction gear carried by said arm, means for adjusting said latter gear to vary the speed of the feed rolls, and means for rotating the adjustable gear.

18. In a box-making machine, the combination of means for bending a strip lengthwise and transversely, and a feed for said strip comprising grooved and ribbed rolls between which the strip passes, gears for rotating said rolls in unison, a pivotally held arm on which one of said rolls is mounted, a spring adjustably holding said arm tending normally to force the roll carried by the arm toward the other roll, a beveled friction wheel movable with one of the rolls, a pivotally held frame, a shaft mounted at the upper end of said frame, a spring tending normally to force the frame toward the friction wheel, a second friction wheel mounted on said shaft, means for rotating said shaft continuously, an adjustable thimble by which the second friction wheel may be adjusted to vary the speed of the first-mentioned friction wheel, means for holding the second friction wheel in its adjusted position, and means located forward of the feeding means for causing the strip to form a loop as it is fed by the feeding means.

19. In a box-making machine, the combination of means for bending a strip lengthwise and transversely, and a feed for said strip comprising grooved and ribbed rolls between which the strip passes, gears for rotating said rolls in unison, a pivotally held arm on which one of said rolls is mounted, a spring adjustably holding said arm tending normally to force the arm toward the other roll, a beveled friction wheel movable with one of the rolls, a pivotally held frame, a shaft mounted at the upper end of said frame, a spring tending normally to force the frame toward the friction wheel, a second friction wheel mounted on said shaft, means for rotating said shaft continuously, an adjustable thimble by which the second friction wheel may be adjusted to vary the speed of the first-mentioned friction wheel, and means for holding the second roll in its adjusted position.

20. In a box-making machine, the combination of means for bending a strip lengthwise and transversely, and a feed for said strip comprising opposed rolls between which the strip passes, gears for rotating said rolls in unison, a pivotally held arm on which one of said rolls is mounted, a spring adjustably holding said arm tending normally to force the roll carried by the arm toward the other roll, a beveled friction wheel movable with one of the rolls, a pivotally held frame, a shaft mounted at the upper end of said frame, a spring tending normally to force the frame toward the friction wheel, a second friction wheel mounted on said shaft, means for rotating said shaft continuously, and means for adjusting the second friction wheel to vary the speed of the feed rolls.

21. The combination of means for feeding a metal strip, a normally fixed bar having a groove and extending lengthwise of the strip, a reciprocatory bar coöperating with the first-mentioned bar and having a substantially V-shaped edge adapted to force the strip and bend the same substantially V-shape, guides extending lengthwise of the strip and adapted to engage the edges of the strip to aline the same between the bars, transverse cutting means, a second feeding means, and means for bending the strip transversely.

22. The combination of means for feeding a metal strip, a normally fixed bar having a groove and extending lengthwise of the strip, a reciprocatory bar coöperating with the first-mentioned bar and having a rib adapted to force the strip and bend the same lengthwise, guides extending lengthwise of the strip and adapted to engage the edges of the strip to aline the same between the bars, transverse cutting means, a second feeding means located forward of said bars, and means for bending the strip transversely.

23. In a box-making machine, the combination of a reciprocatory head having a bar provided with a rib along one edge thereof, means for reciprocating said head, a second bar adapted to coöperate with the first-mentioned bar to fold a narrow metal strip lengthwise thereof, guiding means for the strip engaging the edges of the strip lengthwise thereof and while the strip is held and being folded by said bars, and means for adjusting the second bar.

24. In a box-making machine, the combination of a reciprocatory head having a bar provided with a rib along one edge thereof, means for reciprocating said head, a second bar adapted to coöperate with the first-mentioned bar to fold a metal strip lengthwise thereof, movable levers, guiding means for the strip mounted on said levers, and means for adjusting the second bar.

25. In a box-making machine, the combination of a vertically movable reciprocatory head having a bar extending lengthwise thereof, a normally fixed grooved bar located above the first-mentioned bar and coöperating therewith to fold a strip lengthwise, means for adjusting said grooved bar, alining bars adapted to engage the edge of the strip during the folding operation to aline the same, pivotally held levers, means for adjustably holding said guiding bars on said levers, toggle links connected to said levers in pairs, a rock shaft, arms extending outward from said shaft to operate said toggle links, said arms having projections, arms fixed to said shaft and having means to engage the extensions from said first-mentioned arms, and means for rocking said shaft.

26. In a box-making machine, the combination of a vertically movable reciprocatory head having a bar extending lengthwise thereof, a normally fixed grooved bar located above the first-mentioned bar and coöperating therewith to fold a strip lengthwise, alining bars adapted to engage the edge of the strip during the folding operation to aline the same, pivotally held levers, means for adjustably holding said guiding bars on said levers, and means for operating said levers.

27. In a box-making machine, the combination of a vertically movable reciprocatory head having a bar extending lengthwise thereof, a normally fixed grooved bar located above the first-mentioned bar and coöperating therewith to fold a strip lengthwise, alining bars adapted to engage the edge of the strip during the folding operation to aline the same, pivotally held levers, means for adjustably holding said guiding bars on said levers, toggle links connected to said levers in pairs, a rock shaft, arms extending outward from said shaft to operate said toggle links, and means for operating said arms.

28. In a box-making machine, the combination of a reciprocatory head having a bar-like member, a second bar-like member adapted to coöperate with the first-mentioned bar to fold a strip lengthwise, movable alining members having openings therein, substantially L-shaped members each having a pin adapted to enter one of the openings in said alining members, bolts passing through each of said L-shaped members adapted to adjust the same, movable levers on which the L-shaped members and alining members are supported, and means for bending the folded strip transversely.

29. In a box-making machine, the combination of a reciprocatory head having a bar-like member, a second bar-like member adapted to coöperate with the first-mentioned bar to fold a metal strip lengthwise, movable alining members, substantially L-shaped adjustable members each having means adapted to engage said alining members, and means for moving said members.

30. The combination of feeding means for a metallic strip, means for bending the strip lengthwise, and a second feeding means comprising feed rolls, tilting means, transverse cutting means, a vertically reciprocatory rack, a pinion in mesh with the rack and connected to operate one of the feed rolls, means for varying the extent of movement of the rack and thereby the feed, together with means for bending the formed strip transversely.

31. The combination of feed rolls, tilting means, transverse cutting means, a vertically reciprocatory rack, a pinion in mesh with the rack and connected to operate one of the feed rolls, means for varying the extent of movement of the rack and thereby the feed, together with means for bending the formed strip transversely.

32. In a box-making machine, the combination of lengthwise bending means, transverse bending means, two independently movable feeds for a metal binding, and guide and tilting means comprising two opposed bars with a groove lengthwise thereof changing in shape and angle to shift the position of the binding between the lengthwise bending and the transverse bending means, and tilting rolls coöperating with the guides and comprising ribbed and grooved rolls angularly arranged, a pivotally held arm, one of said rolls being mounted on said arm, and a spring for yieldingly forcing the arm and roll mounted thereon toward the other roll.

33. In a box-making machine, the combination of lengthwise bending means, transverse bending means, feeding means for metal binding, and guide and tilting means comprising bars grooved lengthwise thereof and changing in shape and angle to shift the position of the binding between the lengthwise bending and the transverse bending means.

34. In a box-making machine, the combination of lengthwise bending means, transverse bending means, feeding means for a metal binding, and guide and tilting means comprising fixed guides, and tilting rolls coöperating with the guides.

35. In a box-making machine, the combination of means for supporting binding metal, means for bending the binding metal lengthwise and transversely, and cutting means located between the lengthwise and transverse bending means and comprising two arms, means for moving said arms toward each other, a ribbed member mounted in one of said arms, means for adjusting said member, a yielding member having a groove adapted to coöperate with the ribbed member and mounted upon the other arm, a knife located adjacent to said yielding member and adapted to move over one face of the ribbed member, and screws for adjustably holding said knife.

36. In a box-making machine, the combination of means for supporting binding metal, means for bending the binding metal lengthwise and transversely, and cutting means located between the lengthwise and transverse bending means and comprising two arms, means for moving said arms toward each other, a ribbed member mounted in one of said arms, a yielding member having a groove adapted to coöperate with the ribbed member and mounted upon the other arm, and a knife located adjacent to said yielding member and adapted to move over one face of the ribbed member.

37. In a box-making machine, the combination of means for supporting binding metal, means for bending the binding metal lengthwise and transversely, and cutting means located between the lengthwise and transverse bending means and comprising two shear-like movable members, and a knife carried by one member and adapted to move over the other member.

38. In a box-making machine, the combination of means for bending metal binding lengthwise, means for cutting the binding transversely, a reciprocatory frame having a grooved bar adapted to receive the binding, jaws pivotally held to said frame, an anvil, other and independently movable jaws adapted to coöperate with the first-mentioned jaws to fold the binding entirely about said anvil, a shutter in the form of a beam adapted to initially hold the binding in the grooved bar, and means for releasing said shutter at the initial movement of said reciprocatory frame.

39. In a box-making machine, the combination of means for bending metal binding lengthwise, means for cutting the binding transversely, a reciprocatory frame having a grooved bar adapted to receive the binding, jaws pivotally held to said frame, an anvil, other movable jaws having a horizontal pivotal movement and an up-and-down swinging movement adapted to coöperate with the first-mentioned jaws to fold the binding entirely about said anvil, a shutter adapted to initially hold the binding in the grooved bar, and means for releasing said shutter at the initial movement of said reciprocatory frame.

40. In a box-making machine, the combination of means for feeding a metal strip, means for bending the strip lengthwise, an anvil having a substantially rectangular form, a reciprocatory frame having movable bending jaws adapted to bend the strip on three sides of the anvil, reciprocatory and pivotally held and up-and-down swinging jaws for bending the strip about the remaining side of the anvil and for causing the strip ends to overlap, and holding means for the binding strip.

41. In a box-making machine, the combination of means for feeding metal binding, an anvil having a substantially rectangular form, a reciprocatory frame having movable bending jaws adapted to bend the strip on three sides of the anvil, reciprocatory and pivotally held jaws having a horizontal and up-and-down swinging movement for bending the strip about the remaining side of the anvil and for causing the ends of the binding to overlap, and holding means for the binding strip.

42. The combination of means for feeding a metal strip, means for bending the strip lengthwise, an anvil, a reciprocatory frame having movable bending jaws adapted to bend the strip about a part of the anvil, independently movable jaws movable in opposite directions for completing the bending of the strip about the anvil and for causing the strip ends to overlap, holding means for the binding strip, and means for applying the strip to an object.

43. The combination of means for feeding metal binding, an anvil, a reciprocatory frame having movable bending jaws adapted to bend the binding about a part of the anvil, independently movable jaws movable in opposite directions for completing the bending of the binding about the anvil and for causing the binding ends to overlap, and means for applying the binding to an object.

44. The combination of means for feeding a metal strip, means for bending the strip lengthwise, an anvil having a substantially rectangular form, a reciprocatory frame having movable bending jaws adapted to bend the strip on three sides of the anvil, reciprocatory and pivotally held and independently movable jaws for bending the strip about the remaining sides of the anvil from the opposite sides thereof and for causing the strip ends to overlap, and a clip for holding the binding strip to the anvil and means for releasing the clip.

45. The combination of means for feeding metal binding, an anvil having a substantially rectangular form, a reciprocatory frame having movable bending jaws adapted to bend the binding on three sides of the anvil, reciprocatory and pivotally held and independently movable jaws for bending the binding about the remaining sides of the anvil from the opposite sides thereof and for causing the binding ends to overlap, and a clip for holding the binding strip to the anvil.

46. The combination of a rectangular anvil, means for reciprocating said anvil, a frame having two pivotally held bending jaws adapted to receive the strip and to move the same toward the anvil and adapted to bend the strip about three sides of the anvil; the said anvil forming a pivot for said jaws, pivotally held hooks adapted to hold the strip to the jaws before being bent, means for releasing the hooks, and two reciprocatory and pivotally held jaws movable at right angles with respect to the first-mentioned jaws and adapted to bend the free ends of the strip about the remaining side of the anvil and to cause the ends to overlap.

47. The combination of a rectangular anvil, a frame having two pivotally held bending jaws adapted to receive the strip and to move the same toward the anvil and adapted to bend a binding about three sides of the anvil, the said anvil forming a pivot for said jaws, pivotally held hooks adapted to hold the binding to the jaws before being bent, means for releasing the hooks, and means adapted to bend the free ends of the binding about the remaining side of the anvil and to cause the ends to overlap.

48. The combination of an anvil, jaws for bending a binding about the anvil, and pivotally held hooks mounted on the jaws and adapted to hold the binding in said jaws.

49. The combination of a rectangular anvil, means for reciprocating said anvil, a frame having two pivotally held bending jaws adapted to receive the strip and to move the same toward the anvil and adapted to bend the strip about three sides of the anvil, the said anvil forming a pivot for said jaws, and two pivotally held and independently reciprocatory jaws movable at right angles with respect to the first-mentioned jaws and adapted to bend the free ends of the strip about the remaining side of the anvil.

50. The combination of a rectangular anvil, a frame having two pivotally held bending jaws adapted to receive a binding and to move the same toward the anvil and adapted to bend the binding about three sides of the anvil, the said anvil forming a pivot for said jaws, and two pivotally held and independently reciprocatory and up-and-down swinging jaws movable at right angles with respect to the first-mentioned jaws and adapted to bend the free ends of the binding about the remaining side of the anvil.

51. The combination of means for feeding a single strip of metal, an anvil having corner pieces, a reciprocatory frame movable against one side of the anvil and having pivotally held jaws adapted to engage a part of the anvil and to be pivotally held thereto so as to swing about opposite sides of the anvil to bend the strip about the same, and two reciprocatory jaws having an up-and-down movement and pivotally held so as to swing around the anvil with the latter as a pivot to bend the strip about the remaining side of the anvil and to cause the strip ends to overlap, said anvil being constructed to permit one of the jaws to be moved a certain distance independent of a pivotal movement.

52. The combination of means for feeding metal binding, an anvil having corner pieces, a reciprocatory frame movable against one side of the anvil and having pivotally held jaws adapted to engage a part of the anvil and to be pivotally held thereto so as to swing about opposite sides of the anvil to bend the binding about the same, and two reciprocatory jaws having an up-and-down swinging movement and pivotally held so as to swing around the anvil with the latter as a pivot to bend the binding about the remaining side of the anvil and to cause the binding ends to overlap, said anvil being constructed to permit one of the jaws to be moved a certain distance independent of a pivotal movement.

53. The combination of means for feeding a single strip of metal, an anvil having corner pieces, a reciprocatory frame movable against one side of the anvil and having pivotally held jaws adapted to engage a part of the anvil and to be pivotally held thereto so as to swing about opposite sides of the anvil to bend the strip about the same, two reciprocatory jaws pivotally held so as to swing around the anvil with the latter as a pivot to bend the strip about the remaining side of the anvil, and means for lowering one end of the strip to cause the same to be overlapped by the other, said anvil being constructed to permit one of the jaws to be moved a certain distance independent of a pivotal movement.

54. The combination of means for feeding metal binding, an anvil having corner pieces, a reciprocatory frame movable against one side of the anvil and having pivotally held jaws adapted to engage a part of the anvil and to be pivotally held thereto so as to swing about opposite sides of the anvil to bend the binding about the same, two reciprocatory jaws pivotally held so as to swing around the anvil with the latter as a pivot to bend the binding also about the anvil, and means for lowering one part of the binding to cause the same to be overlapped by another part.

55. The combination of means for feeding a single strip of metal, an anvil having corner pieces, a reciprocatory frame movable against one side of the anvil and having pivotally held jaws adapted to engage a part of the anvil and to be pivotally held thereto so as to swing about opposite sides of the anvil to bend the strip about the same, two movable jaws pivotally held so as to swing bodily upward in the path of the bent strip and then around the anvil with the latter as a pivot to bend the strip about the remaining side of the anvil and to cause the strip ends to overlap, and means for lowering a part of one jaw during its swinging movement.

56. The combination of means for feeding a metal binding, an anvil having corner pieces, a reciprocatory frame movable against one side of the anvil and having pivotally held jaws adapted to engage a part of the anvil and to be pivotally held thereto so as to swing about opposite sides of the anvil to bend the binding about the same, two movable jaws pivotally held so as to swing bodily upward in the path of the bent strip and then around the anvil horizontally with the latter as a pivot to bend the binding about the remaining side of the anvil and to cause the binding ends to overlap, and means for lowering a part of one jaw during its pivotal movement and to bodily swing both jaws up and down.

57. The combination of means for feeding a single strip of metal, an anvil having corner pieces, a reciprocatory frame movable against one side of the anvil and having pivotally held jaws adapted to engage a part of the anvil and to be pivotally held thereto so as to swing about opposite sides of the anvil to bend the strip about the same, means having an up-and-down movement and held to swing around the anvil to bend the strip about the remaining side of the anvil, and a cam for moving said means to move one of the free ends of the strip to cause the ends of the strip to overlap, said anvil being constructed to permit one of the jaws to be moved a certain distance independent of its swinging movement.

58. The combination of means for feeding and folding a strip of metal lengthwise, a reciprocatory frame having means to receive the folded strip and having two pivotally held jaws movable therewith, an anvil having a plurality of sides and socket pieces forming pivots for the jaws about which the jaws may swing to bend the strip about all the sides but one of said anvil, levers to which the jaws are pivotally held, and means comprising independently movable jaws for bending the strip about the anvil on the remaining side thereof.

59. The combination of means for feeding and folding metal binding lengthwise, a reciprocatory frame having means to receive the folded binding and having two pivotally held jaws movable therewith, an anvil having a plurality of sides and socket pieces forming pivots for the jaws about which the jaws may swing to bend the binding about all the sides but one of said anvil, levers to which the jaws are pivotally held, and independently movable and swinging jaws for bending the binding about the anvil on the remaining side thereof.

60. In a box-making machine, the combination of a support, an anvil on said support, means for bending metal binding about said anvil and to cause the ends of said binding to overlap, and a fixed latch located adjacent to the anvil and having one end arranged to engage under the metal binding.

61. In a box-making machine, the combination of an anvil, means for bending metal binding about said anvil to cause the ends of said binding to overlap, and a fixed latch having a hooked end arranged to engage under the metal binding.

62. In a box-making machine, the combination of a reciprocatory support, an anvil mounted on said support and movable therewith, said anvil having detachable corner pieces each provided with a rounded bearing portion and with a substantially V-shaped part, means movable toward the anvil adapted to engage said bearing portions to force metal binding about the anvil so as to be engaged by said sharp corner pieces, and means for clenching the binding to an object.

63. In a box-making machine, the combination of a support, an anvil mounted on said support, said anvil having corner pieces, each provided with a rounded bearing portion and with a substantially V-shaped part, and means movable toward the anvil adapted to engage said bearing portions to force a movable binding about the anvil so as to be engaged by said sharp corner pieces.

64. In a box-making machine, the combination of an anvil, four reciprocatory jaws movable toward the anvil to bend metal binding thereabout on all sides thereof, and means whereby two of the reciprocatory jaws may have a swinging up-and-down movement.

65. In a box-making machine, the combination of an anvil, a plurality of reciprocatory jaws adapted to bend metal binding thereabout on all sides thereof and to make the ends thereof overlap, and means whereby certain of the jaws may have a swinging up-and-down movement.

66. In a box-making machine, the combination of an anvil, four reciprocatory jaws movable toward the anvil to bend metal binding thereabout on all sides thereof, and means whereby certain of the reciprocatory jaws may have a swinging up-and-down movement.

67. In a box-making machine, the combination of an anvil having a slight reciprocatory movement, and jaws movable about the anvil to bend metal binding thereabout, certain of said jaws being made to have a swinging up-and-down movement.

68. In a box-making machine, the combination of an anvil, and jaws movable about the anvil to bend metal binding thereabout, certain of said jaws being made to have a swinging up-and-down movement.

69. In a box-making machine, the combination of an anvil having a slight reciprocatory movement, and four jaws movable toward and about the anvil to bend metal binding thereabout, certain of said jaws being made to have an independent and swinging up-and-down movement.

70. In a box-making machine, the combination of means for feeding and folding a strip of metal lengthwise, a reciprocatory frame having means to receive the folded strip and having two pivotally held jaws movable therewith, a rectangular anvil having rounded socket pieces forming pivots for the jaws about which the jaws may swing to bend the strip about three sides of said anvil, levers to which the jaws are pivotally held, and means comprising independently movable parts for bending the strip about the anvil on the remaining side thereof.

71. In a box-making machine, the combination of means for feeding and folding metal binding lengthwise, a reciprocatory frame having means to receive the folded binding and having two pivotally held jaws movable therewith, an anvil having removable socket pieces forming pivots for the jaws about which the jaws may swing to bend the binding about part of said anvil, levers to which the jaws are pivotally held, and means comprising independently movable parts for bending the binding about the rest of the anvil.

72. The combination of means for feeding a metal strip as a single piece and bending the same lengthwise, two reciprocatory and pivotally held jaws, an anvil having means forming a pivot for said jaws, and two reciprocatory bending jaws movable at right angles to the first-mentioned jaws and adapted to bend the strip about the anvil on one side thereof and to cause the ends of the strip to overlap, each of said latter jaws being pivotally held to have an up-and-down swinging movement.

73. The combination of means for feeding metal binding and bending the same lengthwise, two reciprocatory and pivotally held jaws, an anvil having means forming a pivot for said jaws and about a part of which anvil the binding is bent, and two reciprocatory bending jaws movable at right angles to the first-mentioned jaws and adapted to bend the binding about the rest of the anvil and to cause the ends thereof to overlap, each of said latter jaws being independent and pivotally held to have an up-and-down movement.

74. The combination of means for feeding a metal strip and for bending the same lengthwise thereof, a substantially rectangular anvil having pivotal portions at its corners, a reciprocatory frame having two pivotally held jaws adapted to engage the pivots of the anvil and to move about the same to bend the strip, a reciprocatory head, a jaw held to said head, means whereby the last-mentioned jaw may be given an up-and-down movement to permit the free end of the strip in bending to pass by the same and to receive the strip, means whereby the last-mentioned jaw may be yieldingly held so as to swing about one side of the anvil, a second reciprocatory jaw movable toward the last-mentioned jaw and having independent means whereby the same may have an up-and-down movement, said second jaw having a member pivotally held to swing angularly with respect to the other part of the second reciprocatory jaw to force the end of the strip received thereby below the strip carried by the other jaw, a cam for moving said jaw member downward and normally fixed with relation to the movement of the jaw, and means for moving the two last-mentioned jaws, one in advance of the other whereby the strip may be bent at one side of the anvil and the ends caused to overlap.

75. The combination of means for feeding metal binding and for bending the same lengthwise thereof, a substantially rectangular anvil having pivotal portions at its corners, a reciprocatory frame having two pivotally held jaws adapted to engage the pivots of the anvil and to move about the same to bend the strip, a reciprocatory head, a jaw held to said head, means whereby the last-mentioned jaw may be given an up-and-down swinging movement to permit the free end of the binding in bending to pass by the same and to receive the binding, means whereby the last-mentioned jaw may be yieldingly held so as to swing about one side of the anvil, a second independent and reciprocatory jaw movable toward the last-mentioned jaw and having independent means whereby the same may have a swinging up-and-down movement, said second jaw having a member pivotally held to swing angularly with respect to the other part of the second reciprocatory jaw to force the end of the binding received thereby below the end of the binding carried by the other jaw, means for moving said jaw member downward and normally fixed with relation to the movement of the jaw, and means for moving the two last-mentioned jaws, one in advance of the other whereby the binding may be bent and the ends caused to overlap.

76. The combination of means for feeding a metal strip and for bending the same lengthwise thereof, a substantially rectangular anvil having pivotal portions at its corners, a reciprocatory frame having two pivotally held jaws adapted to engage the pivots of the anvil and to move about the same to bend the strip, a reciprocatory jaw, means whereby the last-mentioned jaw may be given an up-and-down movement to permit the free end of the strip in bending to pass by the same and to receive the strip, means whereby the last-mentioned jaw may be yieldingly held so as to swing about one side of the anvil, a second reciprocatory jaw independently movable toward the last-mentioned jaw and also having means whereby the same may have an independent up-and-down movement, said second jaw having a member pivotally held to swing angularly with respect to the other part of the second jaw to force the end of the strip received thereby below the strip carried by the other jaw.

77. The combination with means for feeding a single strip of metal, of a rectangular anvil having corner pieces, a reciprocatory frame movable against one side of the anvil and having pivotally held jaws adapted to engage a part of the anvil and to be pivotally held thereto so as to swing about opposite sides of the anvil to bend the strip about three sides of the same, two reciprocatory jaws pivotally held to swing up and down and also pivoted so as to swing around the anvil with the latter as a pivot to bend the strip about the remaining side of the anvil and to cause the strip to overlap, and a cam for lowering one jaw during its swinging movement.

78. The combination of means for feeding and bending a strip of metal substantially V-shaped, a reciprocatory frame having means to receive the V-shaped strip and having two pivotally held jaws movable therewith, a four-sided anvil having socket pieces forming pivots for the jaws about which the jaws may swing to bend the strip about three sides of said anvil, levers to which the jaws are pivotally held, and independent and oppositely movable means for bending the strip about the anvil on the remaining side thereof.

79. The combination of means for feeding a metal strip and for bending the same lengthwise thereof, a substantially rectangular anvil having pivotal portions at its corners, a reciprocatory frame having two pivotally held jaws adapted to engage the pivots of the anvil and to move about the same to bend the strip, a reciprocatory head, a jaw held to said head, means whereby the last-mentioned jaw may be given an up-and-down movement to permit the free end of the strip in bending to pass by the same and to receive the strip, means whereby the last-mentioned jaw may be yieldingly held so as to swing about one side of the anvil, a second reciprocatory jaw independently movable toward the last-mentioned jaw and also having means whereby the same may have an up-and-down movement, said second jaw having a member pivotally held to swing angularly with respect to the other part of the second jaw to force the end of the strip received thereby below the strip carried by the other jaw, and a cam for moving said jaw downward and normally fixed with relation to the movement of the jaw.

80. The combination of an anvil provided with corner pieces having substantially V-shaped outer ends, means for removably holding the corner pieces, and means for bending a metal binding about said anvil so as to be engaged by said corner pieces.

81. The combination of plunger and die mechanisms, and an anvil having corner pieces sharpened to an edge, pins adapted to engage the corner pieces, means for adjustably holding the pins to adapt the corner pieces to be removed, and means for bending a metal binding about said anvil so as to be engaged by said corner pieces.

82. The combination of a rectangular anvil having detachable corner pieces each provided with sharpened outer ends, and means for bending a metal binding about said anvil so as to be engaged by the sharpened ends of said corner pieces.

This specification signed and witnessed this 11th day of November A. D. 1912.

CHARLES BURNHAM.

Witnesses:
WM. H. BURNHAM,
R. W. KENNY.